United States Patent
Li et al.

(10) Patent No.: US 9,730,245 B2
(45) Date of Patent: Aug. 8, 2017

(54) RANDOM ACCESS PROCEDURE IN A CELLULAR INTERNET OF THINGS SYSTEM

(71) Applicant: QUALCOMM Incorporated, San Diego, CA (US)

(72) Inventors: Junyi Li, Chester, NJ (US); Frank Anton Lane, Easton, PA (US)

(73) Assignee: QUALCOMM Incorporated, San Diego, CA (US)

( * ) Notice: Subject to any disclaimer, the term of this patent is extended or adjusted under 35 U.S.C. 154(b) by 167 days.

(21) Appl. No.: 14/511,021

(22) Filed: Oct. 9, 2014

(65) Prior Publication Data

US 2016/0105908 A1    Apr. 14, 2016

(51) Int. Cl.
| | |
|---|---|
| *H04W 4/00* | (2009.01) |
| *H04W 74/00* | (2009.01) |
| *H04W 24/08* | (2009.01) |
| *H04W 74/04* | (2009.01) |
| H04W 74/08 | (2009.01) |

(52) U.S. Cl.
CPC ......... *H04W 74/008* (2013.01); *H04W 4/005* (2013.01); *H04W 24/08* (2013.01); *H04W 74/04* (2013.01); *H04W 74/0833* (2013.01)

(58) Field of Classification Search
USPC ....................................... 370/252, 329, 338
See application file for complete search history.

(56) References Cited

U.S. PATENT DOCUMENTS

| | | |
|---|---|---|
| 2011/0274040 A1 | 11/2011 | Pani et al. |
| 2012/0231828 A1 | 9/2012 | Wang et al. |
| 2012/0281530 A1 | 11/2012 | Sambhwani et al. |
| 2013/0242730 A1 | 9/2013 | Pelletier et al. |
| 2013/0301541 A1 | 11/2013 | Mukherjee et al. |
| 2013/0301603 A1 | 11/2013 | Rost et al. |

(Continued)

OTHER PUBLICATIONS

Hasan et al., "Random Access for Machine-to-Machine Communication in LTE-Advanced Networks: Issues and Approaches," IEEE Communications Magazine, Jun. 30, 2013, pp. 86-93, downloaded from http://home.cc.umanitoba.ca/~hasanm35/ra_m2m_mhasan.pdf.

(Continued)

*Primary Examiner* — Yemane Mesfin
*Assistant Examiner* — Mon Cheri Davenport
(74) *Attorney, Agent, or Firm* — Liem T. Do

(57) ABSTRACT

Methods, systems, and devices are described for wireless communication at a user equipment (UE). In some examples, a base station may allocate, to a UE, time and/or frequency resources for transmitting physical random access channel (PRACH) signals. The resource allocation may be apportioned based on a type and class of PRACH signal. For instance, a UE may be assigned a first subset of resources to transmit regularly scheduled traffic and a second subset of resources to transmit on-demand traffic. Regularly scheduled traffic may include, for example, sensor measurements reported to the base station on a predetermined time interval (e.g., 24 hour time interval). In contrast, an on-demand traffic may include an impromptu transmission, initiated based on a detection of at least one reporting trigger (e.g., sensing an abnormality at the UE).

27 Claims, 14 Drawing Sheets

(56) References Cited

U.S. PATENT DOCUMENTS

| 2014/0112286 A1 | 4/2014 | Ahn et al. | |
| 2014/0211677 A1 | 7/2014 | Barbieri et al. | |
| 2015/0023281 A1* | 1/2015 | Wu | H04W 52/146 |
| | | | 370/329 |
| 2015/0036617 A1* | 2/2015 | Guo | H04W 74/0833 |
| | | | 370/329 |
| 2015/0257144 A1* | 9/2015 | Hooli | H04W 72/0406 |
| | | | 370/329 |

OTHER PUBLICATIONS

ISA/EPO, International Search Report and Written Opinion of the International Searching Authority, Int'l. App. No. PCT/US2015/051182, Dec. 8, 2015, European Patent Office, Rijswijk, NL, 11 pgs.

* cited by examiner

RANDOM ACCESS PROCEDURE IN A CELLULAR INTERNET OF THINGS SYSTEM

BACKGROUND

Field of the Disclosure

The present disclosure relates to wireless communication systems, and more particularly to managing resource allocations for random access procedure in a cellular Internet of Things (IoT) system.

Description of Related Art

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems.

By way of example, a wireless multiple-access communication system may include a number of base stations, each simultaneously supporting communication for multiple communication devices, otherwise known as user equipment (UE). A base station may communicate with UEs on downlink channels (e.g., for transmissions from a base station to a UE) and uplink channels (e.g., for transmissions from a UE to a base station).

Some UEs may provide for automated communication. Automated UEs may include those implementing Machine-to-Machine (M2M) communication or Machine Type Communication (MTC). M2M or MTC may refer to data communication technologies that allow devices to communicate with one another or a base station without human intervention. M2M or MTC devices may include UEs and may be used as part of an Internet of Things (IoT). Some M2M or MTC devices in an IoT may include parking meters, water and gas meters, and other sensors that may infrequently communicate small amounts of data.

Therefore, communication requirements of an M2M or MTC device in an IoT network may be significantly lower than those typically required by a non-IoT device (e.g., cell phone). For instance, a non-IoT device (e.g., a cell phone) that may be constantly in motion may require high data rates to support low latency in its voice and data communications. Consequently, when existing cellular systems and protocols are used for IoT devices, the IoT devices may be subject to communication requirements and overhead that are unnecessary and even undesirable, resulting in excessive power drain of the IoT devices.

SUMMARY

Systems, methods, and apparatus for managing resource allocation for random access procedure in an IoT system are described. In accordance with the present disclosure, a base station may allocate, to a UE, time and/or frequency resources for transmitting physical random access channel (PRACH) signals. In some examples, the resource allocation may be apportioned based on a type and class of PRACH signal. For instance, a UE may be assigned a first subset of resources to transmit regularly scheduled traffic and a second subset of resources to transmit on-demand traffic. Regularly scheduled traffic may include, for example, sensor measurements reported to the base station on a predetermined time interval (e.g., 24 hour time interval). In contrast, on-demand traffic may include an impromptu transmission, initiated based on a detection of at least one reporting trigger (e.g., sensing an abnormality at the UE).

Additionally or alternatively, the present disclosure may also relate to reporting a path loss information to the base station in a PRACH signal. In some examples, the path loss information may be determined by receiving a downlink signal from the base station and measuring the strength of the downlink signal.

A method of wireless communication at a UE is described. The method may include receiving, from a base station, a first allocation of resources for sending a first PRACH signal for regularly scheduled transmission, wherein the first allocation of resources includes at least one of a time or a frequency resource, detecting a first reporting trigger for the regularly scheduled transmission, and transmitting, in response to detecting the reporting trigger, the first PRACH signal to the base station over the first allocation of resources.

An apparatus for wireless communication at a UE is described. The apparatus may include means for receiving, from a base station, a first allocation of resources for sending a first PRACH signal for regularly scheduled transmission, wherein the first allocation of resources includes at least one of a time or a frequency resource, means for detecting a first reporting trigger for the regularly scheduled transmission, and means for transmitting, in response to detecting the reporting trigger, the first PRACH signal to the base station over the first allocation of resources.

A further apparatus for wireless communication at a UE is described. The apparatus may include a processor, memory in electronic communication with the processor, and instructions stored in the memory, wherein the instructions are executable by the processor to receive, from a base station, a first allocation of resources for sending a first PRACH signal for regularly scheduled transmission, wherein the first allocation of resources includes at least one of a time or a frequency resource, detect a first reporting trigger for the regularly scheduled transmission, and transmit, in response to detecting the reporting trigger, the first PRACH signal to the base station over the first allocation of resources.

A non-transitory computer-readable medium storing code for wireless communication at a UE is described. The code may include instructions executable to receive, from a base station, a first allocation of resources for sending a first PRACH signal for regularly scheduled transmission, wherein the first allocation of resources includes at least one of a time or a frequency resource, detect a first reporting trigger for the regularly scheduled transmission, and transmit, in response to detecting the reporting trigger, the first PRACH signal to the base station over the first allocation of resources.

Some examples of the method, apparatuses, or non-transitory computer-readable medium described above may further include determining a path loss information associated with the base station, and reporting the path loss information to the base station in the first PRACH signal. Additionally or alternatively, in some examples the path loss information is determined by receiving a downlink signal from the base station and measuring strength of the downlink signal.

Some examples of the method, apparatuses, or non-transitory computer-readable medium described above may further include receiving, from the base station, a second allocation of resources for sending a second PRACH signal for an on-demand transmission, detecting a second reporting trigger for the on-demand transmission, and transmitting the second PRACH signal to the base station based on the detecting, the second PRACH signal transmitted over the first allocation of resources or the second allocation of resources. Additionally or alternatively, in some examples the on-demand transmission is assigned a higher priority than the regularly scheduled transmission.

In some examples of the method, apparatuses, or non-transitory computer-readable medium described above, the first and second allocation of resource fail to overlap. Additionally or alternatively, in some examples the first allocation of resource is a subset of the second allocation of resources.

Some examples of the method, apparatuses, or non-transitory computer-readable medium described above may further include receiving an access level information from the base station, the access level information associated with the regularly scheduled transmission and the on-demand transmission, determining whether access priority for at least one of the first PRACH signal or the second PRACH signal is above the access level information, and transmitting the first PRACH signal or the second PRACH signal based on the determining. Additionally or alternatively, in some examples the access level information is based on a loading factor of the first allocation of resources and the second allocation of resources.

Some examples of the method, apparatuses, or non-transitory computer-readable medium described above may further include receiving, in response to the first PRACH signal, a PRACH response from the base station, and determining an active ID for the UE based in part on the PRACH response. Additionally or alternatively, some examples may include using the active ID for physical downlink shared channel (PDSCH) and PUSCH assignments.

Some examples of the method, apparatuses, or non-transitory computer-readable medium described above may further include transmitting a request for a PUSCH in the first PRACH signal using at least one of the first allocation of resources or the second allocation of resources. Additionally or alternatively, some examples may include exchanging data with a network based on machine type communication (MTC) procedures.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
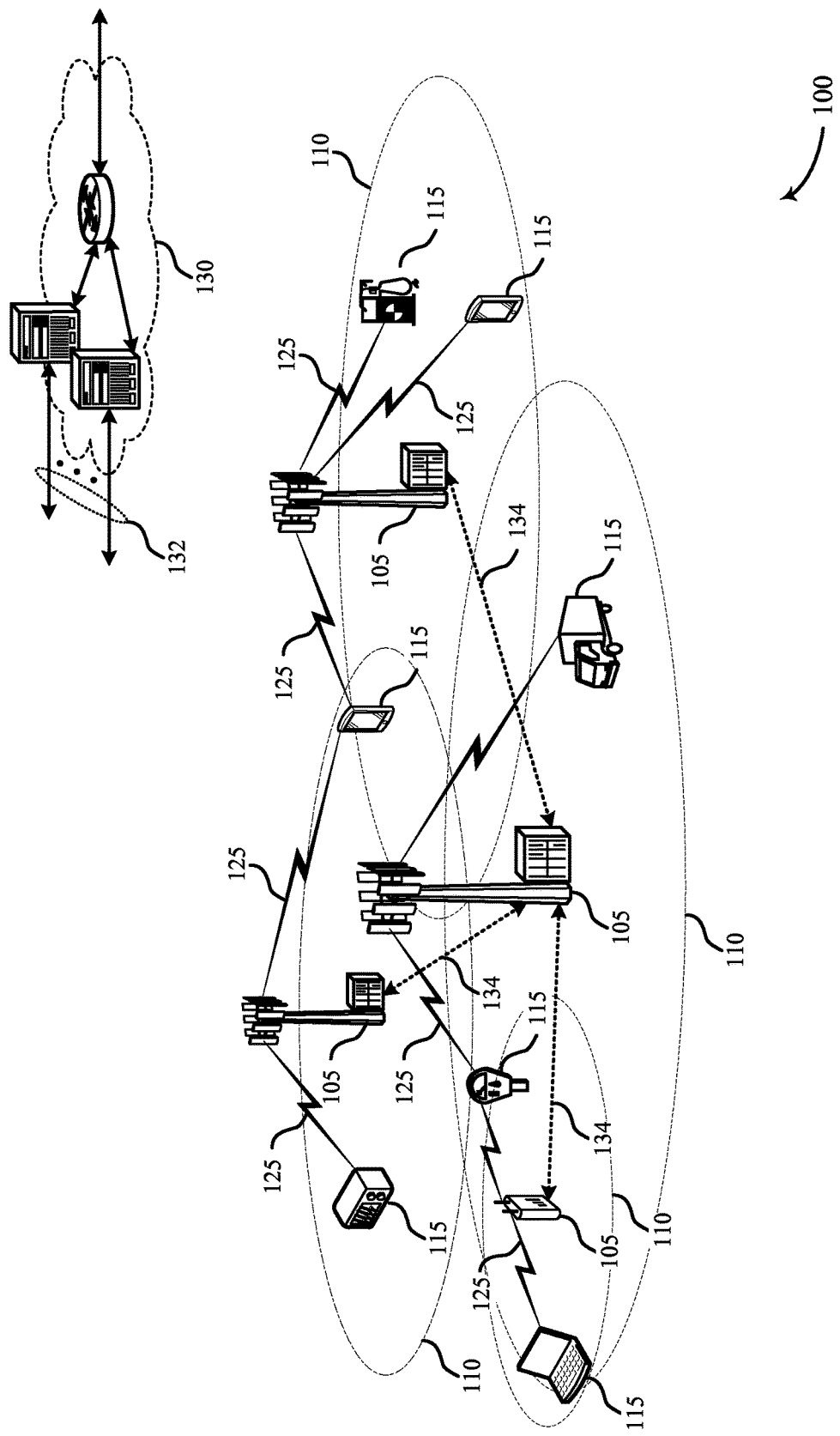
FIG. 1 shows a block diagram of a wireless communication system, in accordance with various aspects of the present disclosure.

As discussed above, M2M or MTC device(s) in an IoT network generally require significantly lower communication resources than those typically required by a non-IoT device. For example, a UE in an IoT network may be configured to infrequently transmit small amounts of data on regularly scheduled intervals. In one example, a UE may be instructed to report at least one sensor measurement once every 24 hour time interval. Intermittently, the UE may also transmit impromptu traffic if the UE detects at least one on-demand reporting trigger (e.g., if UE senses an abnormality). As a result, it may be counterintuitive for a UE that may be limited in power resources (i.e., battery) to contend for resources or to unnecessarily occupy resources (e.g., transmission medium) during such minimal transmission periods.

In accordance with the present disclosure, a base station may allocate certain time or frequency resources to the UE for transmitting on the network. The resource allocation may be based on the type and class of the traffic scheduled for transmission. In some examples, the type and class of the traffic may be associated with a regularly scheduled transmission or an on-demand transmission. Accordingly, a UE in an IoT network may utilize the allocated resources for transmitting PRACH signal(s) based on the type and class of the PRACH signal (i.e., regularly scheduled PRACH signal or on-demand PRACH signal).

Additionally or alternatively, the base station may transmit access level information to the UE, where the access level information identifies a priority level for each of the regularly scheduled class of traffic and on-demand class of traffic. Consequently, the access level information may moderate resource contention(s) between different types of classes. In one example, the on-demand class may be assigned a higher priority than a regularly scheduled class. Thus, during a potential contention of resources between transmission of a regularly scheduled class of traffic and an on-demand class of traffic, the UE may favor the on-demand traffic based on the priority level identified by the access level information. In other examples, the regularly scheduled class of traffic may be assigned a higher priority than the on-demand class.

In a yet further example of the present disclosure, the UE in an IoT may determine path loss information associated with the base station. In some examples, the path loss information may be determined by receiving a downlink signal from the base station and measuring the strength of the downlink signal. Accordingly, in order to synchronize with the base station, the UE may transmit the path loss information to the base station in a PRACH signal. In some examples, the base station may utilize the path loss information to determine the downlink power and manage resources for downlink control and traffic channels (e.g., Physical Downlink Control Channel (PDCCH) and Physical Downlink Shared Channel (PDSCH)).

In other cases, communication between an IoT device and a base station may be improved by using open loop timing synchronization to determine transmit symbol time. As a result, uplink signals from different IoT devices communicating with a same base station in the IoT network may arrive within a window of time, the length of which may be up to the maximum round-trip delay between the IoT devices and the base station. To account for this, the length of a cyclic prefix used in an uplink transmission by an IoT device may be extended, while the length of a cyclic prefix used in a downlink transmission to the IoT device may remain shorter than the extended uplink cyclic prefix.

In some examples, a device may utilize orthogonal frequency division multiple access (OFDMA) for demodulating downlink messages and a combination of Gaussian minimum shift keying (GMSK) and single carrier frequency division multiple access (SC-FDMA) for uplink modulation. The uplink modulation process may include generating a symbol vector with an M-point discrete Fourier transform (DFT), filtering the symbol vector with a frequency domain Gaussian filter, generating a sample vector from the filtered symbol vector utilizing an inverse DFT, and modulating the sample vector utilizing GMSK. In some cases, the uplink modulation may be based on a narrowband resource allocation received from a base station In some examples, a device may synchronize with a cell using a waveform known to the UE beforehand, and common to a group of cells in the local region. The device may then determine a physical broadcast channel (PBCH) time. The device may receive the PBCH and use it to determine a physical layer ID for the cell and a frequency for uplink transmissions. The PBCH may also indicate a channel configuration, which may enable the device to perform a random access procedure. The channel configuration may include a time and frequency resource configuration of a shared traffic channel. In some cases, the device may determine resources for data transmission based on an index of a control channel transmission. In some cases, there may be a predetermined delay between control channel transmissions and data channel transmissions. The device may then enter a low power state during the delay.

In some examples, a device may perform an initial access procedure to establish a connection with a serving cell. The device may then arrange a regular transmission schedule with the serving cell including a discontinuous transmission (DTX) cycle and an acknowledgement schedule. The device may enter a low power mode and refrain from any transmission during the a sleep interval of the DTX cycle. The device may then wake up and transmit a message to the serving cell after the sleep interval without performing an another access procedure. The device may perform another access procedure to transmit at times not covered by the regular transmission schedule. For example, if an acknowledgement (ACK) for the message isn't received, the device may perform another access procedure for retransmission.

In yet another example, an IoT device may use stored control information from a first communication session with the base station to determine the power and timing control information for a subsequent second communication session. Specifically, in this example, a device may establish a first communication session with the base station and receive, during the first communication session, closed loop control information from the base station to aid the device in adjusting transmit signal symbol timing and/or power control levels associated with an uplink transmission. In such instance, the device may store, in its memory, the transmit power and symbol timing information derived from the closed loop control information during the first communication session. Subsequently, the device may utilize the stored closed loop control information from the first communication session to determine the transmit signal power and/or symbol timing to establish a second communication session with the base station.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

FIG. 1 illustrates an example of a wireless communications system 100 in accordance with various aspects of the disclosure. The wireless communications system 100 includes base stations 105, UEs 115, and a core network 130. The core network 130 may provide user authentication, access authorization, tracking, Internet Protocol (IP) connectivity, and other access, routing, or mobility functions. The base stations 105 interface with the core network 130 through backhaul links 132 (e.g., S1, etc.) and may perform radio configuration and scheduling for communication with the UEs 115, or may operate under the control of a base station controller (not shown). In various examples, the base stations 105 may communicate, either directly or indirectly (e.g., through core network 130), with each other over backhaul links 134 (e.g., X1, etc.), which may be wired or wireless communication links.

The base stations 105 may wirelessly communicate with the UEs 115 via one or more base station antennas. Each of the base station 105 sites may provide communication coverage for a respective geographic coverage area 110. In accordance with the present disclosure, the term "coverage area" and "cell" may be used interchangeably to refer to the geographic coverage area 110. In some examples, base stations 105 may be referred to as a base transceiver station, a radio base station, an access point, a radio transceiver, a NodeB, eNodeB (eNB), Home NodeB, a Home eNodeB, or some other suitable terminology. The geographic coverage area 110 for a base station 105 may be divided into sectors making up only a portion of the coverage area (not shown). The wireless communications system 100 may include base stations 105 of different types (e.g., macro and/or small cell base stations). There may be overlapping geographic coverage areas 110 for different technologies.

In some examples, the wireless communications system 100 may be or include an LTE/LTE-A network. In LTE/LTE-A networks, the term evolved Node B (eNB) may be generally used to describe the base stations 105, while the term UE may be generally used to describe the UEs 115. The wireless communications system 100 may be a Heterogeneous LTE/LTE-A network in which different types of eNBs provide coverage for various geographical regions. For example, each eNB or base station 105 may provide communication coverage for a macro cell, a small cell, and/or other types of cell. The term "cell" is a 3GPP term that can be used to describe a base station, a carrier or component carrier associated with a base station, or a coverage area (e.g., sector, etc.) of a carrier or base station, depending on context.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell may cover a relatively smaller geographic area and may allow unrestricted access by UEs with service subscriptions with the network provider. A femto cell also may cover a relatively small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB or a home eNB. An eNB may support one or multiple (e.g., two, three, four, and the like) cells (e.g., component carriers).

The wireless communications system 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The communication networks that may accommodate some of the various disclosed examples may be packet-based networks that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use Hybrid ARQ (HARM) to provide retransmission at the MAC layer to improve link efficiency. In the control plane, the Radio Resource Control (RRC) protocol layer may provide establishment, configuration, and maintenance of an RRC connection between a UE 115 and the base stations 105 or core network 130 supporting radio bearers for the user plane data. At the Physical (PHY) layer, the transport channels may be mapped to Physical channels.

The UEs 115 are dispersed throughout the wireless communications system 100, and each UE 115 may be stationary or mobile. A UE 115 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, or the like. A UE may be able to communicate with various types of base stations and network equipment including macro eNBs, small cell eNBs, relay base stations, and the like.

In the wireless communications system 100, some UEs may provide for automated communication. Automated wireless devices may include those implementing M2M communication or MTC. M2M or MTC may refer to data communication technologies that allow devices to communicate with one another or a base station without human intervention. For example, M2M or MTC may refer to communications from devices that integrate sensors or meters to measure or capture information and relay that information to a central server or application program that can make use of the information or present the information to humans interacting with the program or application. Some UEs 115 may be MTC devices, such as those designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging. An MTC device may operate using half-duplex (one-way) communications at a reduced peak rate. MTC devices may also be configured to enter a power saving "deep sleep" mode when not engaging in active communications. The UEs 115 in wireless communications system 100 that are M2M or MTC devices may also be part of an IoT. Thus, wireless communications system 100 may also include or be part of an IoT.

The communication links 125 shown in wireless communications system 100 may include uplink (UL) transmissions from a UE 115 to a base station 105, and/or downlink (DL) transmissions, from a base station 105 to a UE 115. The downlink transmissions may also be called forward link transmissions while the uplink transmissions may also be called reverse link transmissions. Each communication link 125 may include one or more carriers, where each carrier may be a signal made up of multiple sub-carriers (e.g., waveform signals of different frequencies) modulated according to the various radio technologies described above. Each modulated signal may be sent on a different sub-carrier and may carry control information (e.g., reference signals, control channels, etc.), overhead information, user data, etc. The communication links 125 may transmit bidirectional communications using FDD (e.g., using paired spectrum resources) or TDD operation (e.g., using unpaired spectrum resources). Frame structures for FDD (e.g., frame structure type 1) and TDD (e.g., frame structure type 2) may be defined.

In some embodiments of the system 100, base stations 105 and/or UEs 115 may include multiple antennas for employing antenna diversity schemes to improve communication quality and reliability between base stations 105 and UEs 115. Additionally or alternatively, base stations 105 and/or UEs 115 may employ multiple-input, multiple-output (MIMO) techniques that may take advantage of multi-path environments to transmit multiple spatial layers carrying the same or different coded data.

Wireless communications system 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 115 may be configured with multiple downlink CCs and one or more uplink CCs for carrier aggregation. Carrier aggregation may be used with both FDD and TDD component carriers.

UEs 115 using M2M or MTC in wireless communications system 100 may include low-throughput M2M or MTC devices in an IoT network. These UEs 115 may include support for infrequent and small data transfers. This additional support may include the use of existing wireless communication schemes in ways that do not require the UEs 115 to participate in unnecessary or undesirable communications, as further described below.

In some examples, after the UE 115 decodes system information block (SIB), the UE 115 may transmit a random access channel (RACH) preamble to a base station 105. For example, the RACH preamble may be randomly selected from a set of 64 predetermined sequences. This may enable the base station 105 to distinguish between multiple UEs 115 trying to access the system simultaneously. The base station 105 may respond with a random access response that provides a UL resource grant, a timing advance and a temporary cell radio network temporary identity (C-RNTI). The UE 115 may then transmit an RRC connection request along with a temporary mobile subscriber identity (TMSI) (if the UE 115 has previously connected to the same wireless network) or a random identifier. The RRC connection request may also indicate the reason the UE 115 is connecting to the network (e.g., emergency, signaling, data exchange, etc.). The base station 105 may respond to the connection request with a contention resolution message addressed to the UE 115, which may provide a new C-RNTI. If the UE 115 receives a contention resolution message with the correct identification, it may proceed with RRC setup. If the UE 115 does not receive a contention resolution message (e.g., if there is a conflict with another UE 115) it may repeat the RACH process by transmitting a new RACH preamble.

In accordance with the present disclosure, the base station 105 may allocate to the UE 115 resources for transmitting PRACH signals to the base station 105. In some examples, the resources may include time and/or frequency resources. Depending on the expected loading of random access, PRACH signal may occupy multiple tones of the frame or a single tone in a fraction of the frame. In some examples, the PRACH signal may consist of multiple PRACH segments, each of which may be one tone over 40 millisecond (msec). In accordance with the present disclosure, the UE 115 may be assigned a subset of frames to transmit PRACH signals as the regularly scheduled class. Additionally or alternatively, the UE, in some examples, may also transmit PRACH signal at any time as an on-demand class. For example, if the UE 115 detects an abnormality, the UE 115 may report the abnormality to the remote server without delay. As another example, the UE 115 may transmit impromptu traffic. As a result, in some examples, it may not be feasible for the UE 115 to wait for the regularly scheduled transmission to transmit critical reporting packets. Therefore, in one example, the on-demand class transmission may be treated with a higher priority than the regularly scheduled class.

Figure 2:
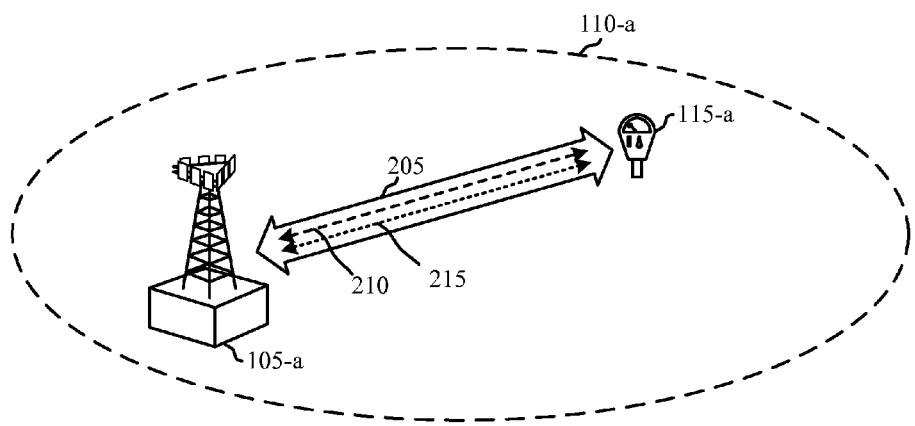
FIG. 2 illustrates an example of managing resource allocations for random access procedure in a cellular IoT wireless system.

FIG. 2 illustrates an example of a wireless communications subsystem 200 for random access procedure in a cellular internet of things system in accordance with various aspects of the present disclosure. Wireless communications subsystem 200 may include a UE 115-a, which may be an example of a UE 115 described above with reference to FIG. 1. Wireless communications subsystem 200 may also include a base station 105-a having a coverage area 110-a, which may be an example of a base station 105 described above with reference to FIG. 1.

In accordance with the present disclosure, the UE 115-a may receive, from a base station 105-a an allocation of resources for transmitting PRACH signal(s) to the base station 105-a over communication link 205. The base station 105-a may allocate certain time or frequency resources to the UE 115-a based on the type and class of traffic scheduled for transmission. For example, a UE 115-a may transmit regularly scheduled traffic 210 to the base station 105-a, where the regularly scheduled traffic 210 is transmitted on a predetermined time interval. Examples of regularly scheduled traffic 210 may include periodic reporting of sensor activities or status. In some examples, regularly scheduled traffic 210 may be considered as low priority traffic.

Additionally or alternatively, the UE 115-a may further be configured to transmit on-demand traffic 215 to the base station over the communication link 205 based on detection of a reporting trigger. For example, in the event that the UE 115-a detects an abnormality or has an immediate need for transmitting data to the network, the UE 115-a may utilize on-demand resources allocated by the base station 105-a for on-demand traffic 215. In some examples, the on-demand traffic may be considered as high priority traffic.

In the event that the triggers associated with the regularly scheduled traffic and the on-demand traffic are detected simultaneously or within a predefined range of time, contention for transmission resources may be resolved based on priority differentiation. In some examples, the base station 105-*a* may broadcast to the UE 115-*a* access level information associated with the regularly scheduled transmission and the on-demand transmission. In some examples, the access level information may depend on the active load of the PRACH channel. Thus, based on receiving the access level information, the UE 115-*a* may determine whether the access priority associated with the type and class of transmission (i.e., regularly scheduled or on-demand) is above the identified access level information. If the access priority for the type and class of traffic scheduled for transmission is below the announced level(s), the UE 115-*a* may not be allowed to transmit the PRACH signal on the communication link 205 during the designated time period.

Conversely, if the UE 115-*a* determines that the type and class of traffic scheduled for transmission are above the announced access level, the UE 115-*a* may utilize the allocated resources for either the regularly scheduled traffic or the on-demand traffic to transmit high priority packets. In some examples of the present disclosure, the lower priority class may be allowed to send a PRACH signal on a subset of the PRACH resources, while the higher priority class may use any or all of the available PRACH resources.

Additionally or alternatively, the UE 115-*a* may, after sending the PRACH signal to the base station 105-*a*, receive a PRACH response from the base station 105-*a*. The PRACH response may be utilized by the UE 115-*a* to resolve PRACH collisions or assign an active identification (ID) to the UE 115-*a*. The active ID may be used for PDSCH and PUSCH assignment and may return to the active ID pool once the UE enters a sleep mode. Furthermore, in some examples, the active UE 115-*a* may, upon receiving an active ID from the base station 105-*a*, transmit a request for uplink traffic channel PUSCH in the PRACH channel. In one example, the initial access and active UE 115-*a* may share the same PRACH resource pool with a slotted ALOHA MAC protocol.

In a yet a further example of the present disclosure, the UE 115-*a* may determine path loss information associated with the base station 105-*a*. In some examples, the path loss information may be determined by receiving a downlink signal from the base station 105-*a* and measuring the strength of the downlink signal on the communication link 205. Accordingly, in order to synchronize with the base station 105-*a*, the UE 115-*a* may transmit the path loss information to the base station 105-*a* in a PRACH signal over communication link 205. In some examples, the base station 105-*a* may utilize the path loss information to determine the downlink power and manage resources for downlink control and traffic channels (e.g., PDCCH and PDSCH).

Figure 3:
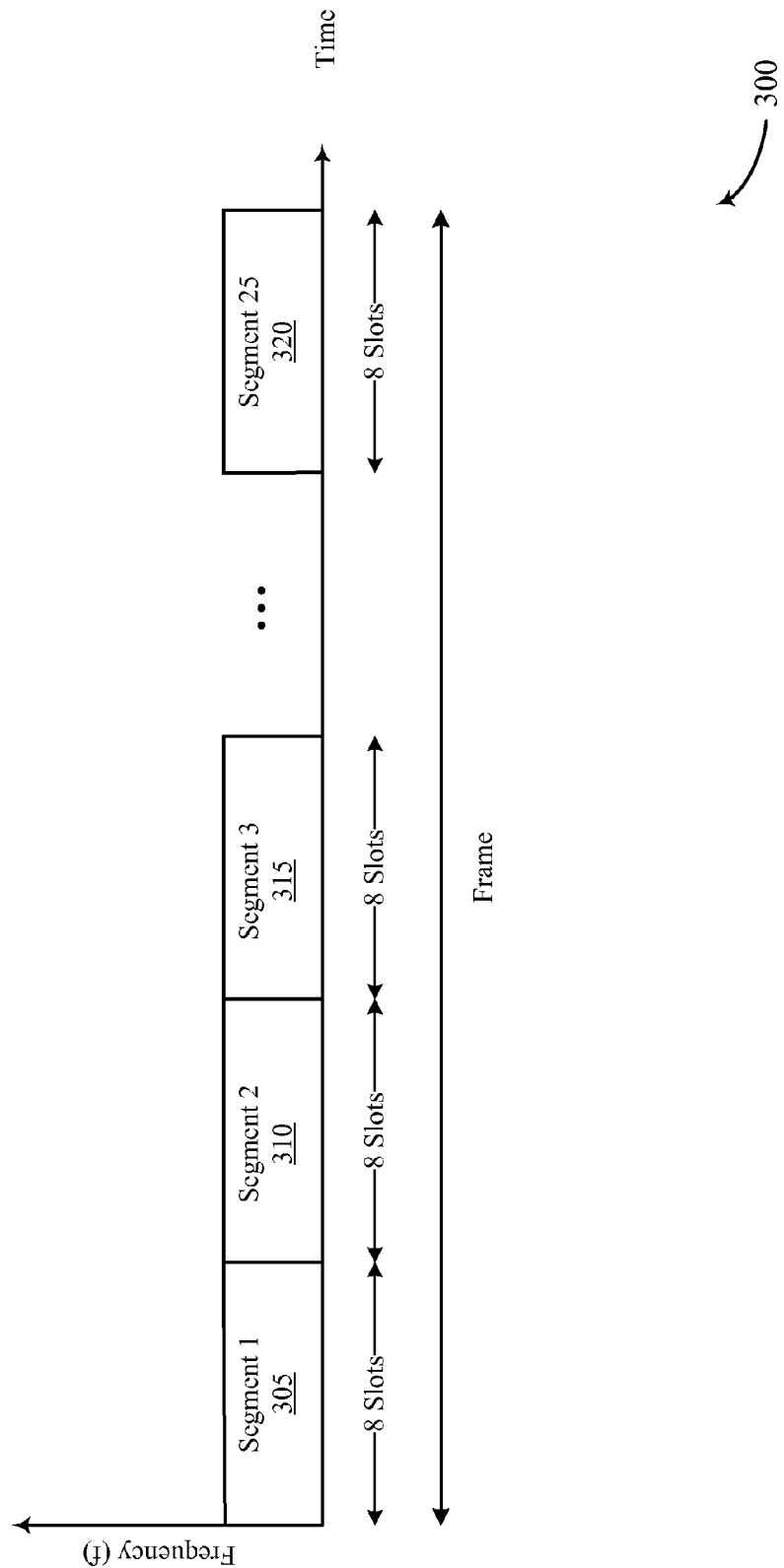
FIG. 3 illustrates an example of a frame structure for managing resource allocations for random access procedure in a cellular IoT wireless system.

FIG. 3 illustrates an example of a frame structure 300 for random access procedure in a cellular internet of things system in accordance with various aspects of the present disclosure. The frame structure 300 may be an example of resources utilized by the UE 115 to transmit PRACH signals to the base station 105 in an IoT network as described above with reference to FIGS. 1 and 2.

In one example, the frame structure 300 may include a plurality of segments (305, 310, 315, 320), each of which may be a tone over 40 msec. A base station 105 may allocate to the UE 115 time and frequency resources on the frame structure 300 associated with the type and class of the traffic scheduled for transmission. In some examples, a baseline uplink random access channel may occupy one tone in the entire frame. However, depending on the expected loading of the random access, PRACH may occupy either multiple tones or one tone in a fraction of the frame.

In some examples, the UE 115 may be assigned a subset (e.g., segment 305) of the frame 300 to transmit a regularly scheduled PRACH signal. In contrast, an on-demand PRACH signal may utilize any or all of the frame 300 to transmit the on-demand PRACH signal to the base station 105. Therefore, in some examples the allocation for the regularly scheduled transmission and the on-demand scheduled transmission may overlap. In other examples, the allocation of resources for the regularly scheduled transmission may be a subset of allocation for the on-demand transmission. In such examples, the UE 115 may assign higher priority to the on-demand transmission than to the regularly scheduled transmission.

Figure 4:
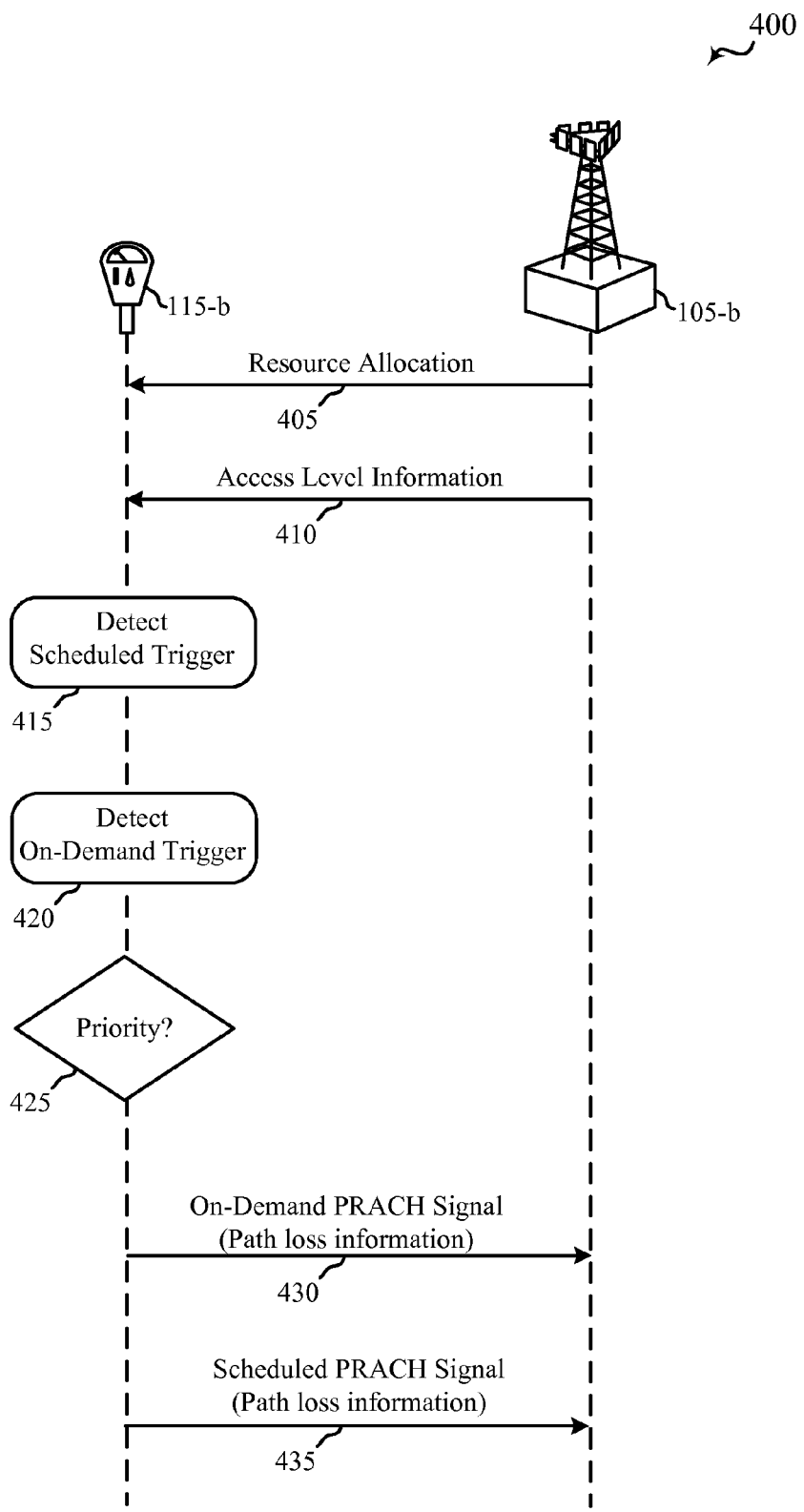
FIG. 4 illustrates a communication diagram between a base station and a UE for managing resource allocations for random access procedure in a cellular IoT wireless system

FIG. 4 illustrates an example of a swim diagram 400 for random access procedure in a cellular internet of things system in accordance with various aspects of the present disclosure. The swim diagram 400 may include a UE 115-*b*, which may be an example of a UE 115 described above with reference to FIGS. 1 and 2. The diagram 400 may also include a base station 105-*b*, which may be an example of a base station 105 described above with reference to FIGS. 1 and 2.

In accordance with the present disclosure, the base station 105-*b* may allocate resources 405 to the UE 115-*b* for regularly scheduled traffic and on-demand traffic. The allocated resources may include time and frequency resources. Additionally or alternatively, the base station may also transmit access level information 410 to the UE 115-*b* to resolve resource contentions between regularly scheduled traffic and the on-demand traffic.

The UE 115-*b* may, during a first time period, detect a scheduled trigger (at step 415) for reporting at least one type of traffic to the base station 105-*b* during a prescheduled time interval. However, either simultaneously or within a predefined time period, the UE 115-*b* may also detect an on-demand trigger (at step 420). As a result, the UE 115-*b* may attempt to transmit both the scheduled PRACH signal and the on-demand PRACH signal using the allocated resources. In order to resolve resource contention between multiple types of traffic, the UE 115-*b* may determine a priority level (at step 425) associated with each type of traffic based on the access level information 410 received from the base station.

Accordingly, the UE 115-*b* may determine whether the priority level associated with the scheduled PRACH signal or the on-demand signal is above the announced access level. Based in part on the priority determination (at step 425), the UE 115-*b* may transmit the on-demand PRACH signal 430 to the base station 105-*b* using resources allocated for either the scheduled transmission or the on-demand transmission. In some examples, the PRACH signal 430 may include path loss information associated with the base station. The path loss information may be associated with the open loop power control performed by the UE 115-*b* to determine the downlink path loss between the base station 105-*b* and the UE 115-*b*. Upon the termination of the on-demand PRACH signal transmission 430, the UE 115-*b* may transmit the pending scheduled PRACH signal 435 to the base station 105-*b* over the resources allocated for the scheduled transmission.

Figure 5:
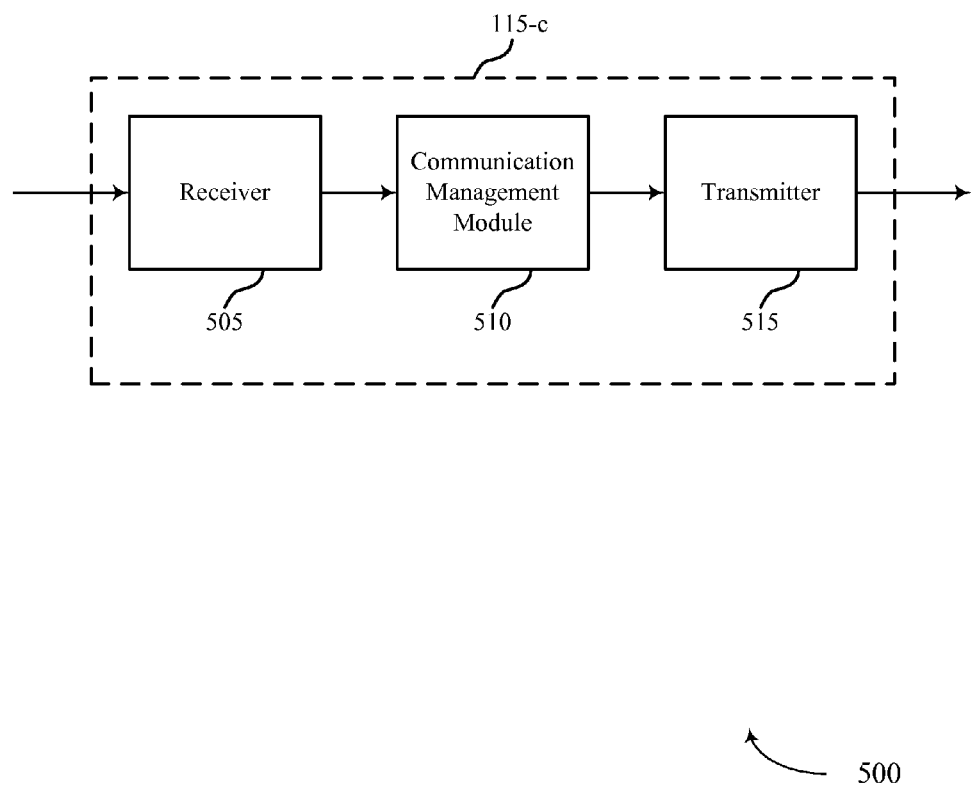
FIG. 5 shows a block diagram of a device configured for use in wireless communication, in accordance with various aspects of the present disclosure.

FIG. 5 shows a block diagram 500 of a UE 115-*c* configured for a random access procedure in a cellular internet of things system in accordance with various aspects of the present disclosure. UE 115-*c* may be an example of aspects of a UE 115 described with reference to FIGS. 1-4. UE 115-*c* may include a receiver 505, a communication management module 510, or a transmitter 515. Each of these components may be in communication with each other.

The receiver 505 may receive information such as packets, user data, or control information associated with various information channels (e.g., control channels, data channels, and information related to random access procedure in a cellular internet of things system, etc.). Information may be passed on to the communication management module 510, and to other components of UE 115-c. In some examples, the receiver 505 may receive, in response to the first PRACH signal, a PRACH response from the base station.

The communication management module 510 may receive, from a base station, a first allocation of resources for sending a first PRACH signal for regularly scheduled transmission, wherein the first allocation of resources includes at least one of a time or a frequency resource. The communication management module 510 may also detect a first reporting trigger for the regularly scheduled transmission, and transmit, in response to detecting the reporting trigger, the first PRACH signal to the base station over the first allocation of resources.

The transmitter 515 may transmit signals received from other components of UE 115-c. In some embodiments, the transmitter 515 may be collocated with the receiver 505 in a transceiver module. The transmitter 515 may include a single antenna, or it may include a plurality of antennas.

Figure 6:
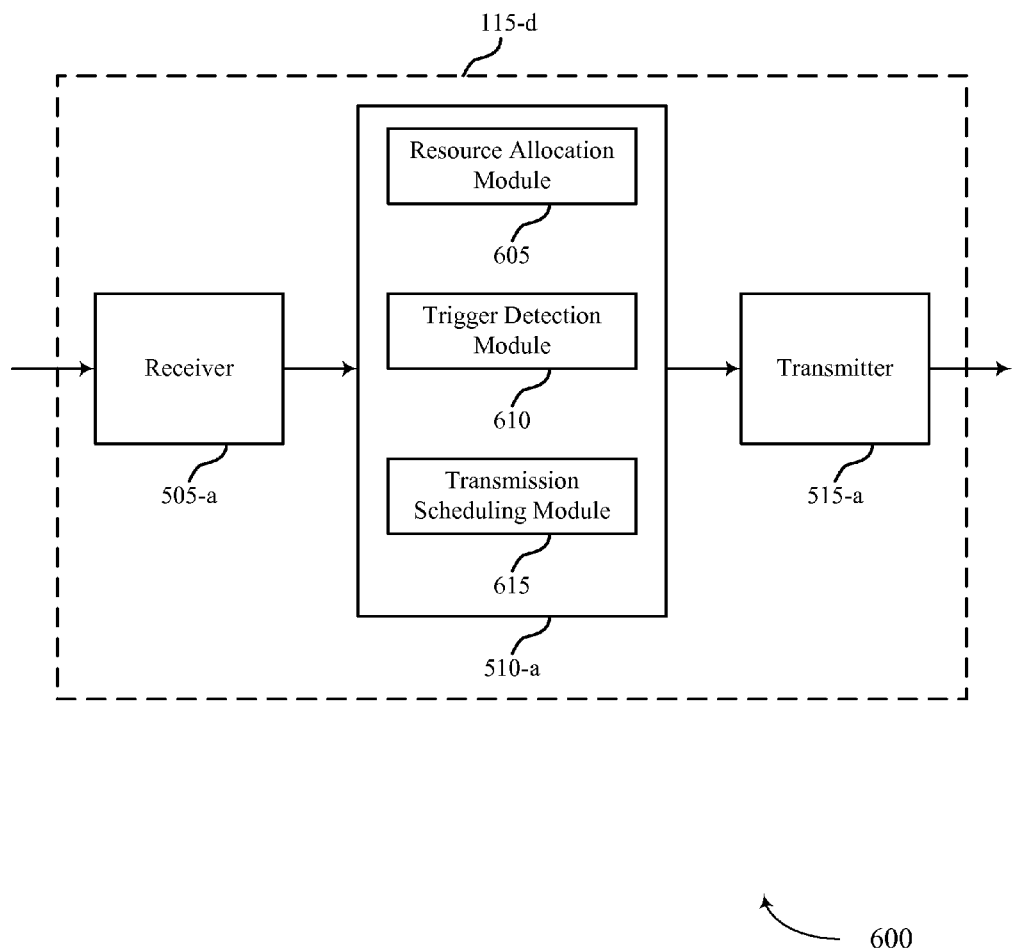
FIG. 6 shows a block diagram of a device configured for use in wireless communication, in accordance with various aspects of the present disclosure.

FIG. 6 shows a block diagram 600 of a UE 115-d for random access procedure in a cellular internet of things system in accordance with various aspects of the present disclosure. UE 115-d may be an example of aspects of a UE 115 described with reference to FIGS. 1-5. UE 115-d may include a receiver 505-a, a communication management module 510-a, or a transmitter 515-a. Each of these components may be in communication with each other. The communication management module 510-a may also include a resource allocation module 605, a trigger detection module 610, and a transmission scheduling module 615.

The receiver 505-a may receive information which may be passed on to communication management module 510-a, and to other components of UE 115-d. The communication management module 510-a may perform the operations described above with reference to FIG. 5. The transmitter 515-a may transmit signals received from other components of UE 115-d. The receiver 505-a, communication management module 510-a, and transmitter 515-a may be examples of the receiver 505, communication management module 510, and transmitter 515 described with respect to FIG. 5.

The resource allocation module 605 may receive, from a base station, a first allocation of resources for sending a first PRACH signal for a regularly scheduled transmission, wherein the first allocation of resources includes at least one of a time or a frequency resource as described above with reference to FIGS. 2-4. The resource allocation module 605 may also receive, from the base station, a second allocation of resources for sending a second PRACH signal for an on-demand transmission. In some examples, the first and second allocation of resource do not overlap. In some examples, the first allocation of resource may be a subset of the second allocation of resources.

The trigger detection module 610 may detect a first reporting trigger for the regularly scheduled transmission as described above with reference to FIGS. 2-4. The trigger detection module 610 may also detect a second reporting trigger for the on-demand transmission as described above with reference to FIGS. 2-4.

The transmission scheduling module 615 may transmit, in response to detecting the reporting trigger, the first PRACH signal to the base station over the first allocation of resources as described above with reference to FIGS. 2-4. The transmission scheduling module 615 may also transmit the second PRACH signal to the base station based on the detecting, the second PRACH signal transmitted over the first allocation of resources or the second allocation of resources. In some examples, the on-demand transmission may be assigned a higher priority than the regularly scheduled transmission. The transmission scheduling module 615 may also transmit the first PRACH signal or the second PRACH signal based on the determining.

Figure 7:
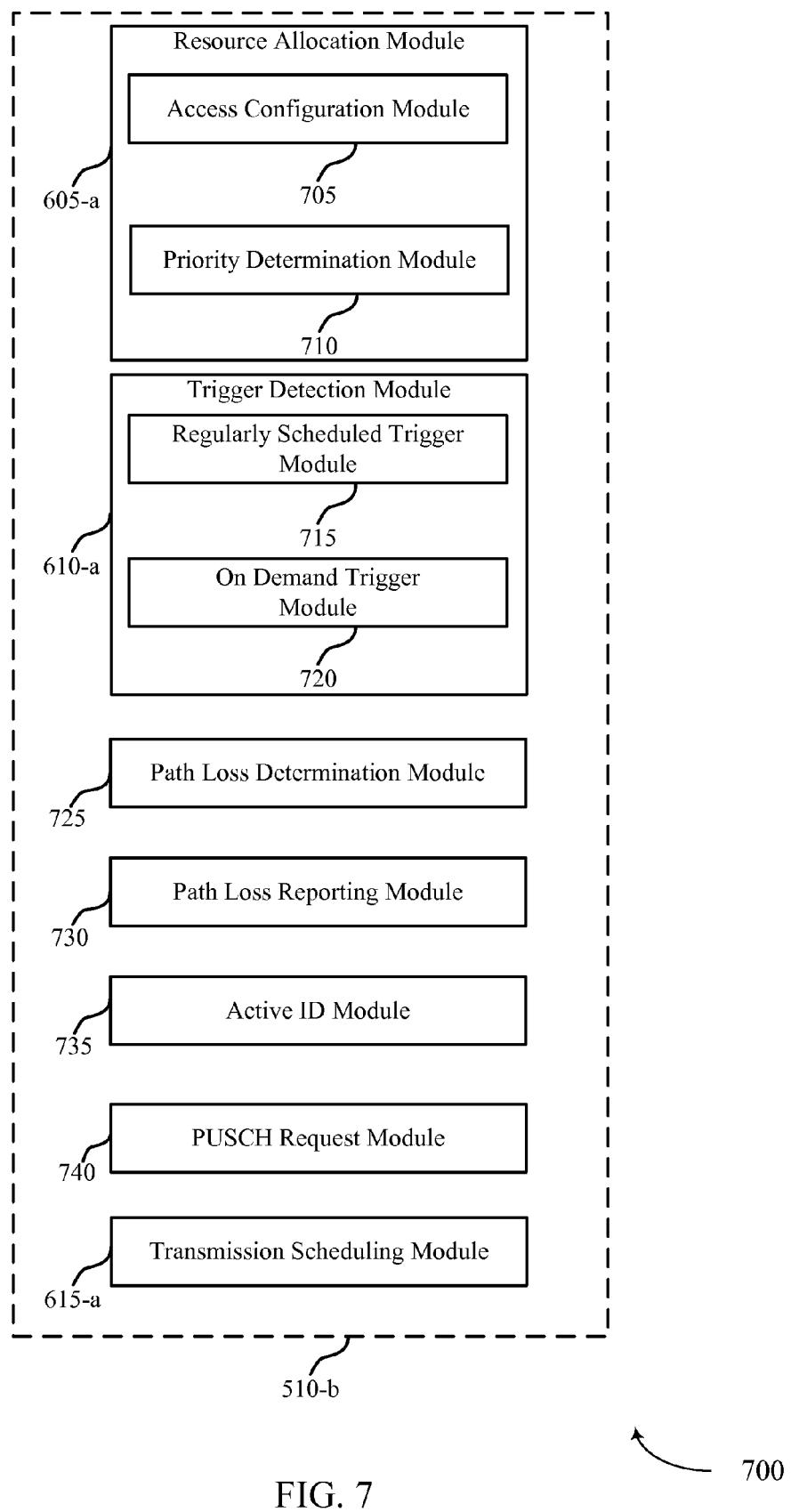
FIG. 7 shows a block diagram of a communication management module configured for random access procedure in a cellular internet of things system in accordance with various aspects of the present disclosure.

FIG. 7 shows a block diagram 700 of a communication management module 510-b for random access procedure in a cellular internet of things system in accordance with various aspects of the present disclosure. The communication management module 510-b may be an example of aspects of a communication management module 510 described with reference to FIG. 5 or 6. The communication management module 510-b may include a resource allocation module 605-a, a trigger detection module 610-a, and a transmission scheduling module 615-a. Each of these modules may perform the functions described above with reference to FIG. 6. The communication management module 510-b may also include access configuration module 705, priority determination module 710, regularly scheduled trigger module 715, an on-demand trigger module 720, path loss determination module 725, path loss reporting module 730, active ID module 735 and PUSCH request module 740.

In some examples, the resource allocation module 605-a may include the access configuration module 705 configured to receive access level information from the base station, the access level information being associated with the regularly scheduled transmission and the on-demand transmission as described above with reference to FIGS. 2-4. In some examples, the access level information may be based on a loading factor of the first allocation of resources and the second allocation of resources. The resource allocation module 605-a may further include a priority determination module 710 to determine whether access priority for at least one of the regularly scheduled transmission or the on-demand transmission is above the access level information as described above with reference to FIGS. 2-4. In some examples, the access priority may be based on the access level information received at the access configuration module 705.

Additionally or alternatively, the communication management module 510-b may further include a trigger detection module 610-a comprising a regularly scheduled trigger module 715 and the on-demand trigger module 720. Each of the regularly scheduled trigger module 715 and the on-demand trigger module 720 may be configured to detect at least one reporting trigger to schedule transmission to the base station. In some examples, the regularly scheduled trigger module 715 may detect a condition for transmitting a packet to the base station at a predetermined time interval. For example, the regularly scheduled trigger module 715 may detect sensor measurements configured to be reported to the base station at a predetermined time interval (e.g., 24 hour time interval). In contrast, the on-demand trigger module 720 may detect a reporting trigger(s) for the on-demand transmission as described above with reference to FIGS. 2-4. On-demand traffic may include an impromptu transmission, initiated based on a detection of at least one reporting trigger (e.g., sensing an abnormality at the UE).

In some examples, the path loss determination module 725 may determine path loss information associated with the base station as described above with reference to FIGS. 2-4.

In some examples, the path loss information may be determined by receiving a downlink signal from the base station and measuring strength of the downlink signal. Additionally or alternatively, a path loss reporting module 730 may report the path loss information to the base station in a PRACH signal as described above with reference to FIGS. 2-4.

In accordance with the present disclosure, the communication management module 510-*b* may further receive, in response to transmitting a PRACH signal, a PRACH response from the base station. Based on the received PRACH response, an active ID module 735 may determine an active ID for the UE as described above with reference to FIGS. 2-4. The active ID module 735 may also use the active ID for PDSCH and PUSCH assignments.

In yet a further example, the PUSCH request module 740 may transmit a request for a PUSCH in the first PRACH signal using at least one of the first allocation of resources or the second allocation of resources as described above with reference to FIGS. 2-4. The PUSCH request module 740 may also exchange data with a network based on MTC procedures.

Figure 8:
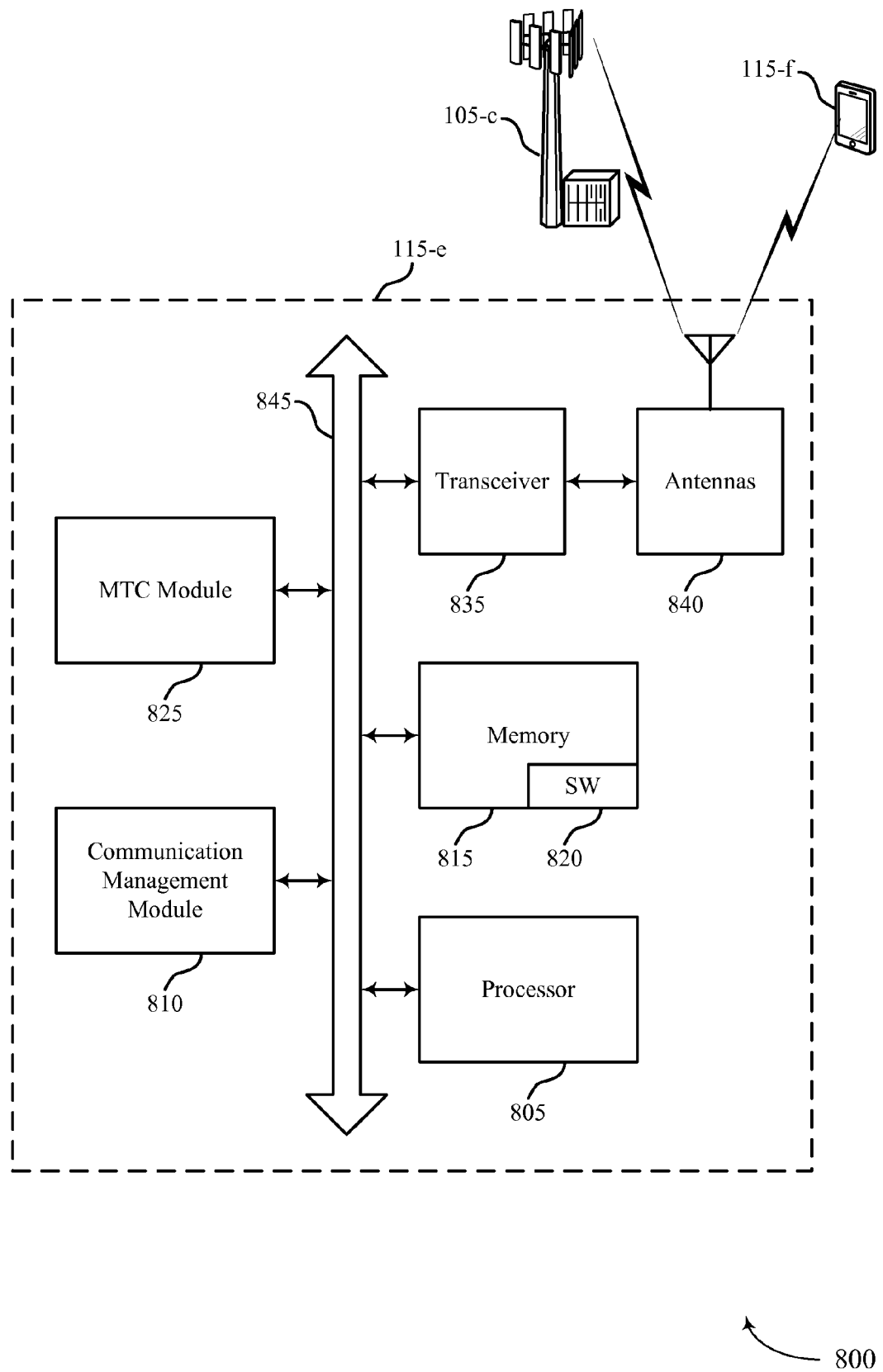
FIG. 8 illustrates a block diagram of a system including a UE configured for random access procedure in a cellular internet of things system in accordance with various aspects of the present disclosure.

FIG. 8 shows a diagram of a system 800 including a UE 115 configured for random access procedure in a cellular internet of things system in accordance with various aspects of the present disclosure. System 800 may include UE 115-*e*, which may be an example of a UE 115 described above with reference to FIGS. 1-7. UE 115-*e* may include a communication management module 810, which may be an example of a communication management module 510 described with reference to FIGS. 5-7. UE 115-*e* may also include an MTC Module 825. UE 115-*e* may also include components for bi-directional voice and data communications including components for transmitting communications and components for receiving communications. For example, UE 115-*e* may communicate bi-directionally with UE 115-*f* or base station 105-*c*.

In some examples, the MTC module 825 may facilitate improved communication between the UE 115-*e* and a base station 105-*c* by using open loop timing synchronization to determine transmit symbol time. In this example, the MTC module 825 may also facilitate the use of an extended cyclic prefix length in uplink transmissions, while non-extended cyclic prefix lengths may be used with downlink transmissions. By using extended uplink cyclic prefixes, uplink signals from different UEs 115 may arrive at a base station 105-*c* within a window of time (e.g., the maximum round-trip delay between the UE 115 and the base station 105-*c*) covered by the uplink cyclic prefix.

In other examples of a MTC procedures, UE 115-*e* may utilize orthogonal frequency division multiple access (OFDMA) for demodulating downlink messages and a combination of Gaussian minimum shift keying (GMSK) and single carrier frequency division multiple access (SC-FDMA) for uplink modulation. The uplink modulation process may include generating a symbol vector with an M-point discrete Fourier transform (DFT), filtering the symbol vector with a frequency domain Gaussian filter, generating a sample vector from the filtered symbol vector utilizing an inverse DFT, and modulating the sample vector utilizing GMSK. In some cases, the uplink modulation may be based on a narrowband resource allocation received from a base station.

In other examples of a MTC procedures, UE 115-*e* may synchronize with a cell using a waveform known to the UE beforehand, and common to a group of cells in the local region. The UE may then determine a physical broadcast channel (PBCH) time. UE 115-*e* may receive the PBCH and use it to determine a physical layer ID for the cell and a frequency for uplink transmissions. The PBCH may also indicate a channel configuration, which may enable UE 115-*e* to perform a random access procedure. The channel configuration may include a time and frequency resource configuration of a shared traffic channel. In some cases, UE 115-*e* may determine resources for data transmission based on an index of a control channel transmission. In some cases, there may be a predetermined delay between control channel transmissions and data channel transmissions. UE 115-*e* may then enter a low power state during the delay.

In other examples of a MTC procedures, UE 115-*e* may perform an initial access procedure to establish a connection with a serving cell. UE 115-*e* may then arrange a regular transmission schedule with the serving cell including a discontinuous transmission (DTX) cycle and an acknowledgement schedule. UE 115-*e* may enter a low power mode and refrain from any transmission during the a sleep interval of the DTX cycle. UE 115-*e* may then wake up and transmit a message to the serving cell after the sleep interval without performing an another access procedure. UE 115-*e* may perform another access procedure to transmit at times not covered by the regular transmission schedule. For example, if an acknowledgement (ACK) for the message isn't received, UE 115-*e* may perform another access procedure for retransmission.

In yet another example of a MTC procedures, the MTC module 825 may facilitate using stored control information from a first communication session with the base station to determine the power and timing control information for a subsequent second communication session. Specifically, in this example, the MTC module 825 may establish a first communication session with the base station 105-*c* and receive, during the first communication session, closed loop control information from the base station 105-*c* to aid the UE 115-*e* in adjusting transmit signal symbol timing and/or power control levels associated with an uplink transmission. In such instance, the MTC module 825 may facilitate storing, in the memory 815, the transmit power and symbol timing information derived from the closed loop control information during the first communication session. Subsequently, the MTC module 825 may utilize the stored closed loop control information from the first communication session to determine the transmit signal power and/or symbol timing to establish a second communication session with the base station 105-*c*.

UE 115-*e* may also include a processor module 805, and memory 815 (including software (SW)) 820, a transceiver module 835, and one or more antenna(s) 840, each of which may communicate, directly or indirectly, with each other (e.g., via buses 845). The transceiver module 835 may communicate bi-directionally, via the antenna(s) 840 or wired or wireless links, with one or more networks, as described above. For example, the transceiver module 835 may communicate bi-directionally with a base station 105-*c* or another UE 115-*f*. The transceiver module 835 may include a modem to modulate the packets and provide the modulated packets to the antenna(s) 840 for transmission, and to demodulate packets received from the antenna(s) 840. While UE 115-*e* may include a single antenna 840, UE 115-*e* may also have multiple antennas 840 capable of concurrently transmitting or receiving multiple wireless transmissions.

The memory 815 may include random access memory (RAM) and read only memory (ROM). The memory 815 may store computer-readable, computer-executable software/firmware code 820 including instructions that, when executed, cause the processor module 805 to perform various functions described herein (e.g., random access procedure in a cellular internet of things system, etc.). Alternatively, the software/firmware code 820 may not be directly executable by the processor module 805 but cause a computer (e.g., when compiled and executed) to perform functions described herein. The processor module 805 may include an intelligent hardware device, (e.g., a central processing unit (CPU) such as an ARM® based processor, a microcontroller, an ASIC, etc.)

Figure 9:
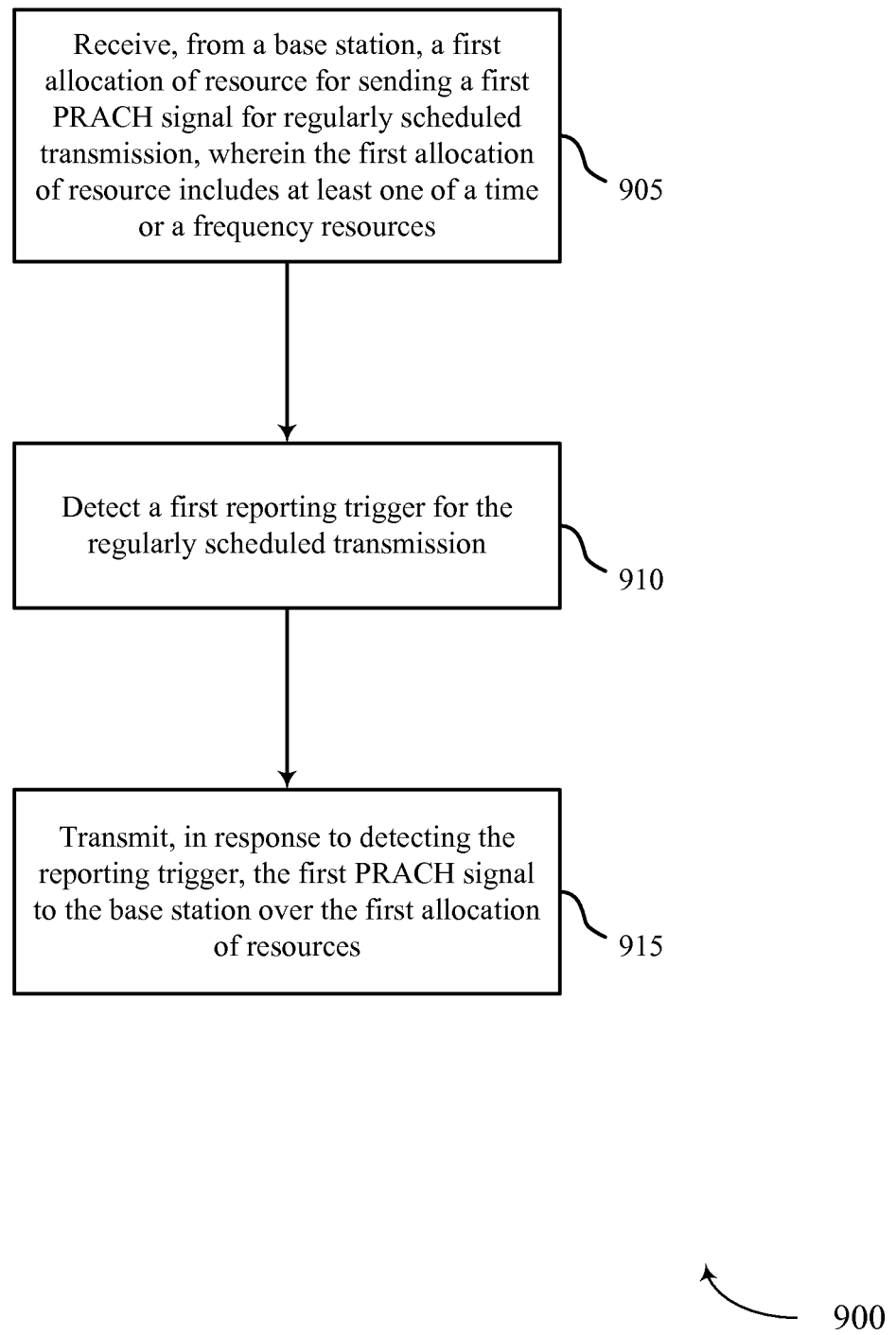
FIG. 9 shows a flowchart illustrating a method for random access procedure in a cellular internet of things system in accordance with various aspects of the present disclosure.

FIG. 9 shows a flowchart illustrating a method 900 for random access procedure in a cellular internet of things system in accordance with various aspects of the present disclosure. The operations of method 900 may be implemented by a UE 115 or its components as described with reference to FIGS. 1-8. For example, the operations of method 900 may be performed by the communication management module 510 as described with reference to FIGS. 5-9. In some examples, a UE 115 may execute a set of codes to control the functional elements of the UE 115 to perform the functions described below. Additionally or alternatively, the UE 115 may perform aspects the functions described below using special-purpose hardware.

At block 905, the UE 115 may receive, from a base station, a first allocation of resources for sending a first PRACH signal for regularly scheduled transmission, wherein the first allocation of resources includes at least one of a time or a frequency resource as described above with reference to FIGS. 2-4. In certain examples, the operations of block 905 may be performed by the resource allocation module 605 as described above with reference to FIG. 6.

At block 910, the UE 115 may detect a first reporting trigger for the regularly scheduled transmission as described above with reference to FIGS. 2-4. In certain examples, the operations of block 910 may be performed by the trigger detection module 610 as described above with reference to FIG. 6.

At block 915, the UE 115 may transmit, in response to detecting the reporting trigger, the first PRACH signal to the base station over the first allocation of resources as described above with reference to FIGS. 2-4. In certain examples, the operations of block 915 may be performed by the transmission scheduling module 615 as described above with reference to FIG. 6.

Figure 10:
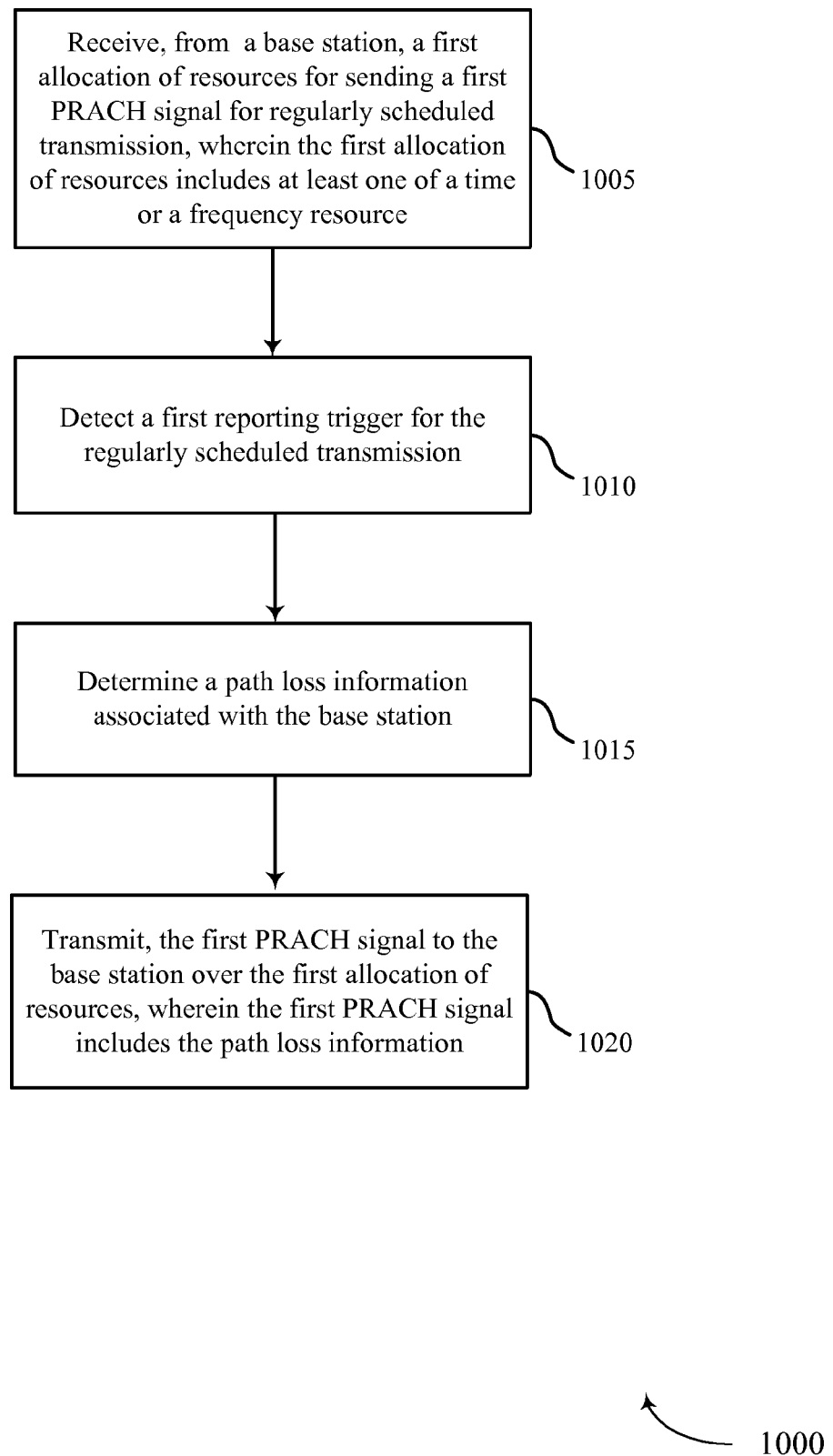
FIG. 10 shows a flowchart illustrating a method for random access procedure in a cellular internet of things system in accordance with various aspects of the present disclosure.

FIG. 10 shows a flowchart illustrating a method 1000 for random access procedure in a cellular internet of things system in accordance with various aspects of the present disclosure. The operations of method 1000 may be implemented by a UE 115 or its components as described with reference to FIGS. 1-8. For example, the operations of method 1000 may be performed by the communication management module 510 as described with reference to FIGS. 5-9. In some examples, a UE 115 may execute a set of codes to control the functional elements of the UE 115 to perform the functions described below. Additionally or alternatively, the UE 115 may perform aspects the functions described below using special-purpose hardware. The method 1000 may also incorporate aspects of method 900 of FIG. 9.

At block 1005, the UE 115 may receive, from a base station, a first allocation of resources for sending a first PRACH signal for regularly scheduled transmission, wherein the first allocation of resources includes at least one of a time or a frequency resource as described above with reference to FIGS. 2-4. In certain examples, the operations of block 1005 may be performed by the resource allocation module 605 as described above with reference to FIG. 6.

At block 1010, the UE 115 may detect a first reporting trigger for the regularly scheduled transmission as described above with reference to FIGS. 2-4. In certain examples, the operations of block 1010 may be performed by the regularly scheduled trigger module 715 as described above with reference to FIG. 7.

At block 1015, the UE 115 may determine a path loss information associated with the base station as described above with reference to FIGS. 2-4. In certain examples, the operations of block 1010 may be performed by the path loss determination module 725 as described above with reference to FIG. 7.

At block 1020, the UE 115 may transmit, in response to detecting the reporting trigger, the first PRACH signal to the base station over the first allocation of resources as described above with reference to FIGS. 2-4. In some examples, the first PRACH signal may include the path loss information. In certain examples, the operations of block 1020 may be performed by the transmission scheduling module 615 as described above with reference to FIG. 6 and/or path loss reporting module 730 as described above with reference to FIG. 7.

Figure 11:
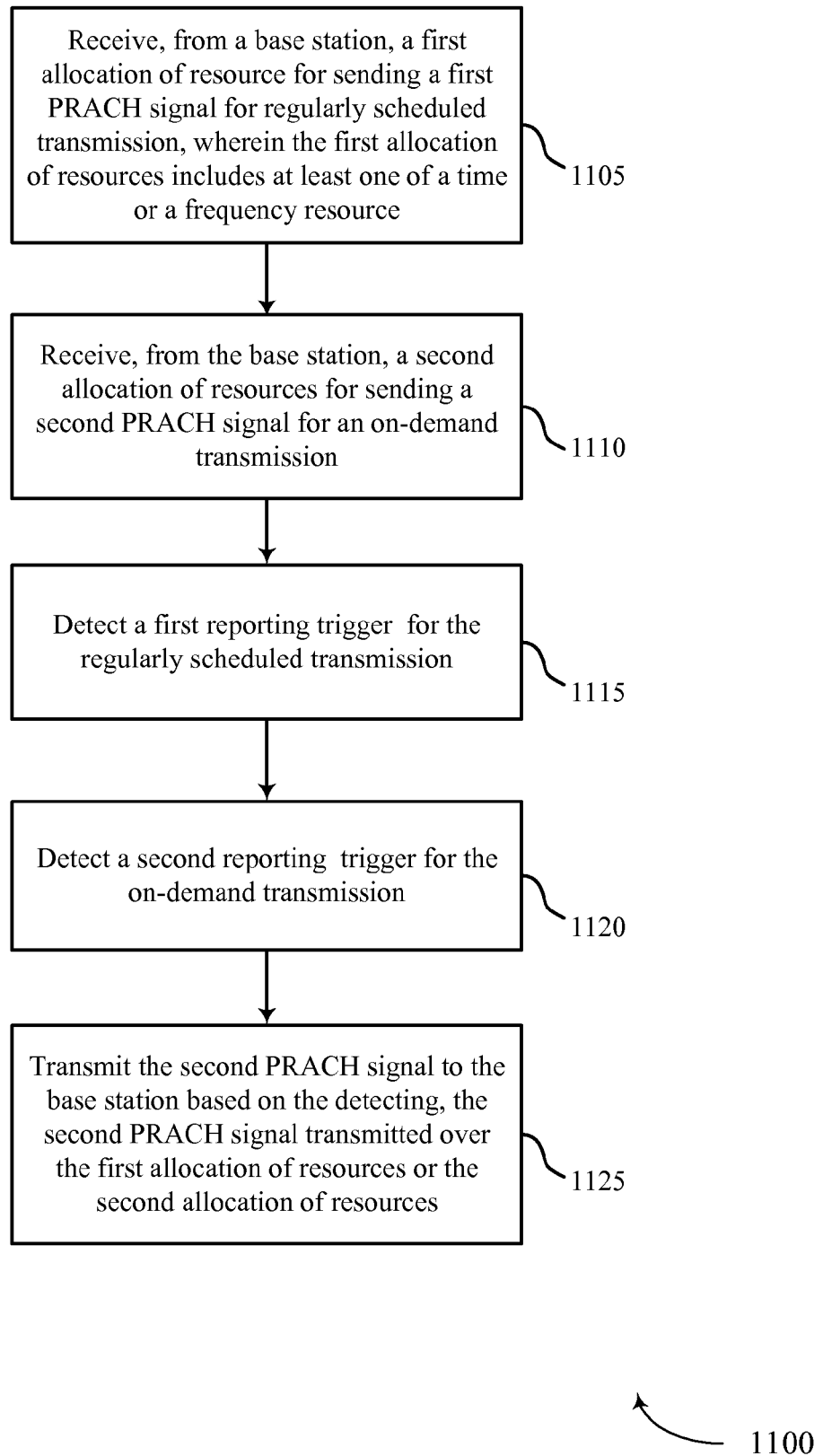
FIG. 11 shows a flowchart illustrating a method for random access procedure in a cellular internet of things system in accordance with various aspects of the present disclosure.

FIG. 11 shows a flowchart illustrating a method 1100 for random access procedure in a cellular internet of things system in accordance with various aspects of the present disclosure. The operations of method 1100 may be implemented by a UE 115 or its components as described with reference to FIGS. 1-8. For example, the operations of method 1100 may be performed by the communication management module 510 as described with reference to FIGS. 5-9. In some examples, a UE 115 may execute a set of codes to control the functional elements of the UE 115 to perform the functions described below. Additionally or alternatively, the UE 115 may perform aspects the functions described below using special-purpose hardware. The method 1100 may also incorporate aspects of methods 900 and 1000 of FIGS. 9 and 10.

At block 1105, the UE 115 may receive, from a base station, a first allocation of resources for sending a first PRACH signal for regularly scheduled transmission, wherein the first allocation of resources includes at least one of a time or a frequency resource as described above with reference to FIGS. 2-4. In certain examples, the operations of block 1105 may be performed by the resource allocation module 605 as described above with reference to FIG. 6.

At block 1110, the UE 115 may receive, from the base station, a second allocation of resources for sending a second PRACH signal for an on-demand transmission as described above with reference to FIGS. 2-4. In certain examples, the operations of block 1110 may be performed by the resource allocation module 605 as described above with reference to FIG. 6.

At block 1115, the UE 115 may detect a first reporting trigger for the regularly scheduled transmission as described above with reference to FIGS. 2-4. In certain examples, the operations of block 1115 may be performed by the regularly scheduled trigger module 715 as described above with reference to FIG. 7.

At block 1120, the UE 115 may detect a second reporting trigger for the on-demand transmission as described above with reference to FIGS. 2-4. In certain examples, the operations of block 1120 may be performed by the on-demand trigger module 720 as described above with reference to FIG. 7.

At block 1125, the UE 115 may transmit the second PRACH signal to the base station based on detecting the first and the second reporting triggers. In some examples, the second PRACH signal may be transmitted over the first allocation of resources or the second allocation of resources as described above with reference to FIGS. 2-4. In accordance with the present disclosure, determining whether to transmit over the first or the second allocation of resources may be based on the priority level of each of the regularly scheduled transmission traffic and the on-demand traffic. In some examples, the priority determination may be based on the access level information received from the base station. In some examples, the on-demand traffic may be allocated a higher priority than the regularly scheduled traffic. In other examples, the regularly scheduled traffic may be allocated a higher priority than the on-demand traffic. Depending on the expected loading, a PRACH signal may occupy multiple tones or a fraction of a tone in a frame. In accordance with the present disclosure, the lower priority class (i.e., regularly scheduled traffic or on-demand traffic) may be limited to transmit PRACH signal in a subset of the PRACH resources, while the higher priority class may use the full set of available PRACH resources. In certain examples, the operations of block 1125 may be performed by the transmission scheduling module 615 as described above with reference to FIG. 6, access configuration module 705, and/or priority determination module 710 as described with reference to FIG. 7.

Figure 12:
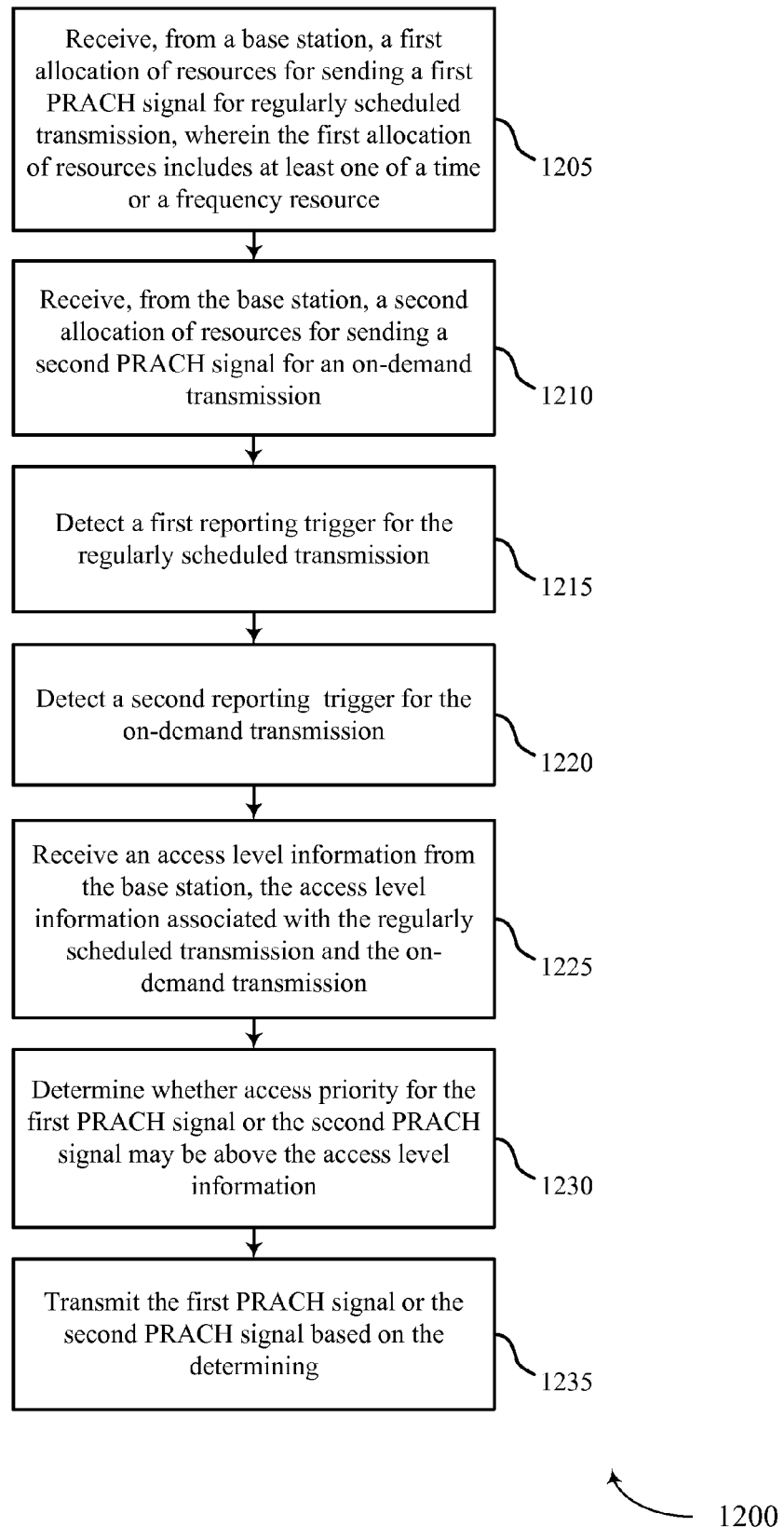
FIG. 12 shows a flowchart illustrating a method for random access procedure in a cellular internet of things system in accordance with various aspects of the present disclosure.

FIG. 12 shows a flowchart illustrating a method 1200 for random access procedure in a cellular internet of things system in accordance with various aspects of the present disclosure. The operations of method 1200 may be implemented by a UE 115 or its components as described with reference to FIGS. 1-8. For example, the operations of method 1200 may be performed by the communication management module 510 as described with reference to FIGS. 5-9. In some examples, a UE 115 may execute a set of codes to control the functional elements of the UE 115 to perform the functions described below. Additionally or alternatively, the UE 115 may perform aspects the functions described below using special-purpose hardware. The method 1200 may also incorporate aspects of methods 900, 1000, and 1100 of FIGS. 9-11.

At block 1205, the UE 115 may receive, from a base station, a first allocation of resources for sending a first PRACH signal for regularly scheduled transmission, wherein the first allocation of resources includes at least one of a time or a frequency resource as described above with reference to FIGS. 2-4. In certain examples, the operations of block 1205 may be performed by the resource allocation module 605 as described above with reference to FIG. 6.

At block 1210, the UE 115 may receive, from the base station, a second allocation of resources for sending a second PRACH signal for an on-demand transmission as described above with reference to FIGS. 2-4. In certain examples, the operations of block 1220 may be performed by the resource allocation module 605 as described above with reference to FIG. 6.

At block 1215, the UE 115 may detect a first reporting trigger for the regularly scheduled transmission as described above with reference to FIGS. 2-4. In certain examples, the operations of block 1210 may be performed by the regularly scheduled trigger module 715 as described above with reference to FIG. 7.

At block 1220, the UE 115 may detect a second reporting trigger for the on-demand transmission as described above with reference to FIGS. 2-4. In certain examples, the operations of block 1220 may be performed by the on-demand trigger module 720 as described above with reference to FIG. 7.

At block 1225, the UE 115 may receive an access level information from the base station, the access level information associated with the regularly scheduled transmission and the on-demand transmission as described above with reference to FIGS. 2-4. In certain examples, the operations of block 1235 may be performed by the access configuration module 705 as described above with reference to FIG. 7.

At block 1230, the UE 115 may determine whether access priority for at least one of the first PRACH signal (i.e., regularly scheduled transmission) or the second PRACH (i.e., on-demand transmission) signal is above the access level information as described above with reference to FIGS. 2-4. Depending on the expected loading, a PRACH signal may occupy multiple tones or a fraction of a tone in a frame. In accordance with the present disclosure, the lower priority class (i.e., regularly scheduled traffic or on-demand traffic) may be limited to transmit PRACH signal in a subset of the PRACH resources, while the higher priority class may use the full set of available PRACH resources. In some examples, the on-demand transmission may be allocated a higher priority. In some examples, the operations of block 1230 may be performed by the priority determination module 710 as described above with reference to FIG. 7.

At block 1235, the UE 115 may transmit the first PRACH signal or the second PRACH signal based on the determining which signal has a higher priority based on the access level information as described above with reference to FIGS. 2-4. Based on the determined priority level, the UE 115 may transmit the first or the second PRACH signal to the base station on the allocated resources. In certain examples, the operations of block 1235 may be performed by the transmission scheduling module 615 as described above with reference to FIG. 6.

Figure 13:
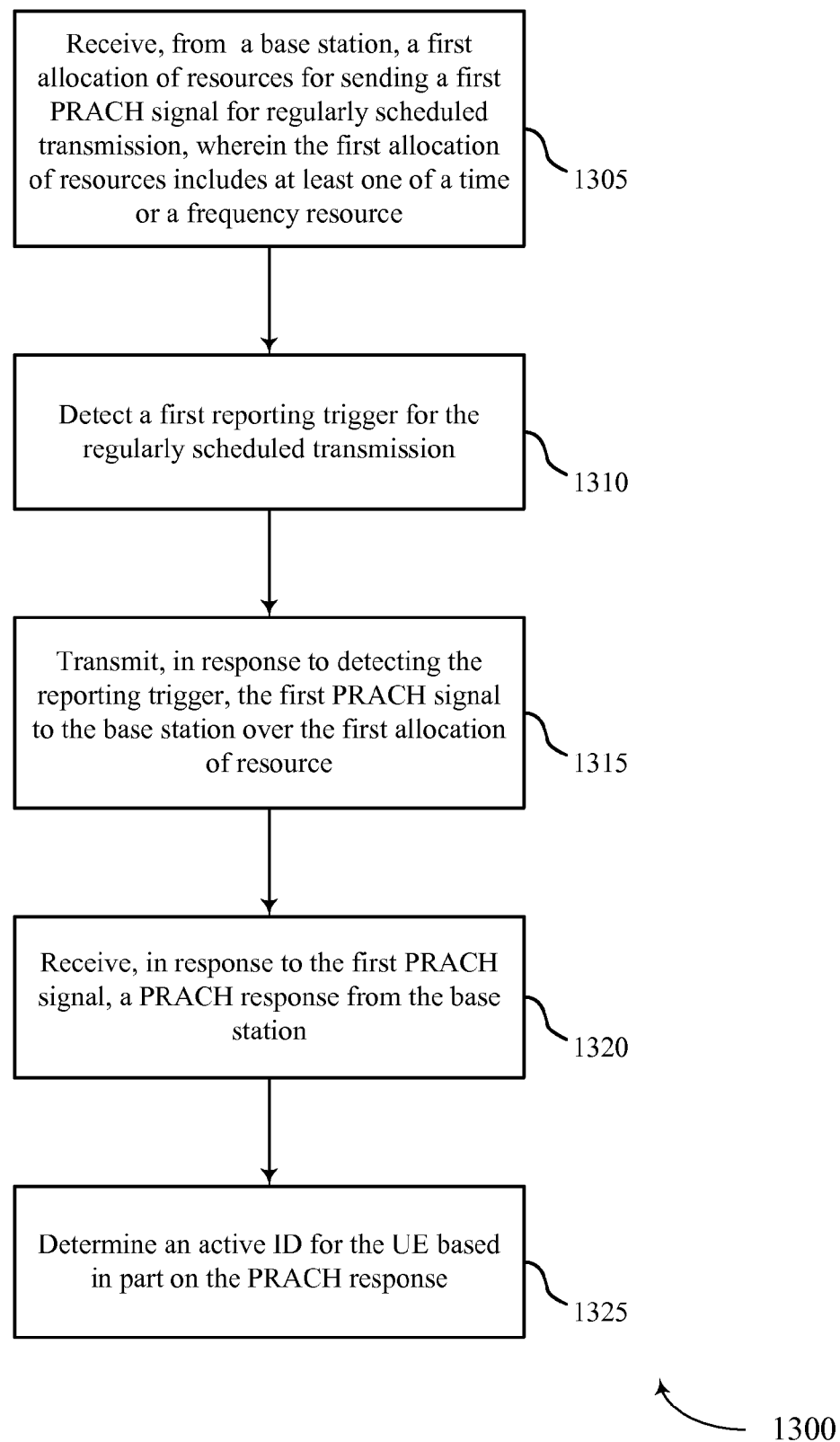
FIG. 13 shows a flowchart illustrating a method for random access procedure in a cellular internet of things system in accordance with various aspects of the present disclosure.

FIG. 13 shows a flowchart illustrating a method 1300 for random access procedure in a cellular internet of things system in accordance with various aspects of the present disclosure. The operations of method 1300 may be implemented by a UE 115 or its components as described with reference to FIGS. 1-8. For example, the operations of method 1300 may be performed by the communication management module 510 as described with reference to FIGS. 5-9. In some examples, a UE 115 may execute a set of codes to control the functional elements of the UE 115 to perform the functions described below. Additionally or alternatively, the UE 115 may perform aspects the functions described below using special-purpose hardware. The method 1300 may also incorporate aspects of methods 900, 1000, 1100, and 1200 of FIGS. 9-12.

At block 1305, the UE 115 may receive, from a base station, a first allocation of resources for sending a first PRACH signal for regularly scheduled transmission, wherein the first allocation of resources includes at least one of a time or a frequency resource as described above with reference to FIGS. 2-4. In certain examples, the operations of block 1305 may be performed by the resource allocation module 605 as described above with reference to FIG. 6.

At block 1310, the UE 115 may detect a first reporting trigger for the regularly scheduled transmission as described above with reference to FIGS. 2-4. In certain examples, the operations of block 1310 may be performed by the regularly scheduled trigger module 715 as described above with reference to FIG. 7.

At block 1315, the UE 115 may transmit, in response to detecting the reporting trigger, the first PRACH signal to the base station over the first allocation of resources as described above with reference to FIGS. 2-4. In certain examples, the operations of block 1315 may be performed by the transmission scheduling module 615 as described above with reference to FIG. 6.

At block 1320, the UE 115 may receive, in response to the first PRACH signal, a PRACH response from the base station as described above with reference to FIGS. 2-4. In certain examples, the operations of block 1320 may be performed by the receiver 505 as described above with reference to FIG. 5.

At block 1325, the UE 115 may determine an active ID for the UE based in part on the PRACH response as described above with reference to FIGS. 2-4. In certain examples, the operations of block 1325 may be performed by the active ID module 735 as described above with reference to FIG. 7.

Figure 14:
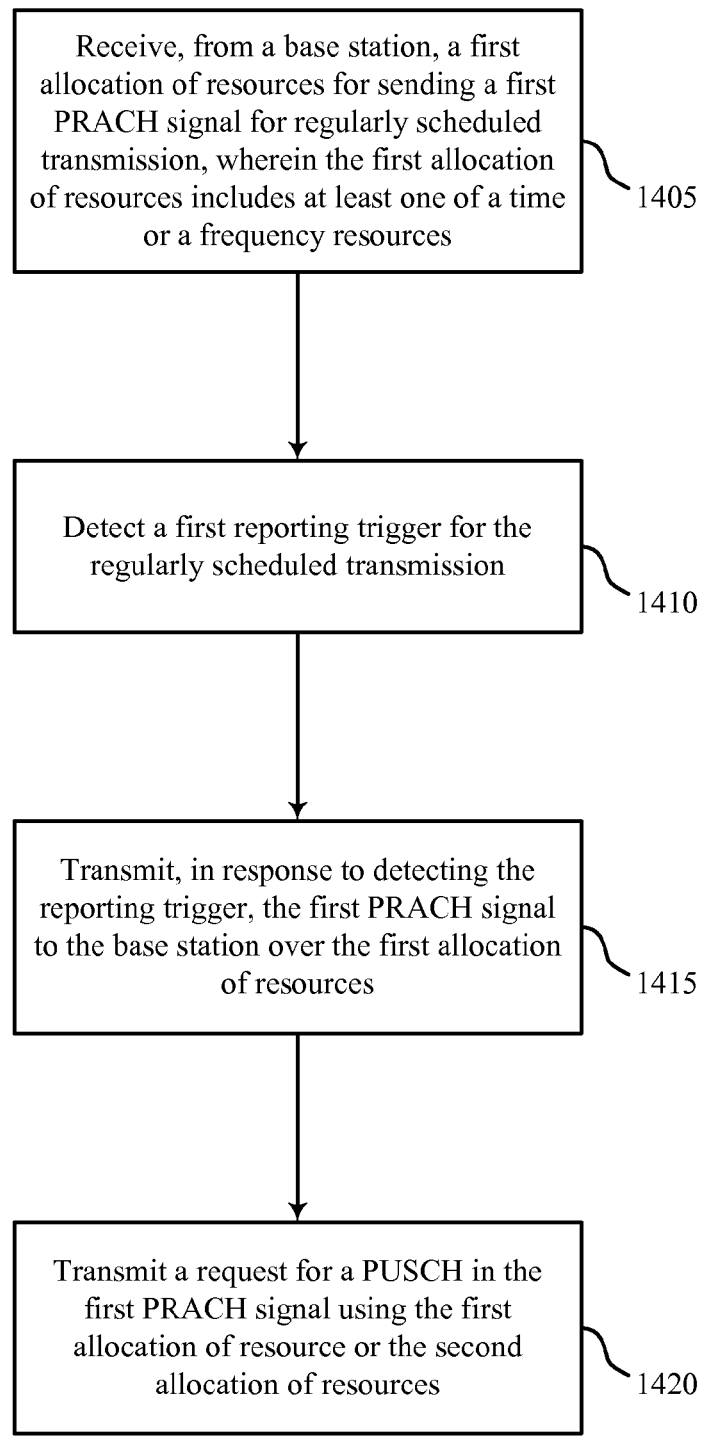
FIG. 14 shows a flowchart illustrating a method for random access procedure in a cellular internet of things system in accordance with various aspects of the present disclosure.

FIG. 14 shows a flowchart illustrating a method 1400 for random access procedure in a cellular internet of things system in accordance with various aspects of the present disclosure. The operations of method 1400 may be implemented by a UE 115 or its components as described with reference to FIGS. 1-8. For example, the operations of method 1400 may be performed by the communication management module 510 as described with reference to FIGS. 5-9. In some examples, a UE 115 may execute a set of codes to control the functional elements of the UE 115 to perform the functions described below. Additionally or alternatively, the UE 115 may perform aspects the functions described below using special-purpose hardware. The method 1400 may also incorporate aspects of methods 900, 1000, 1100, 1200, and 1300 of FIGS. 9-13.

At block 1405, the UE 115 may receive, from a base station, a first allocation of resources for sending a first PRACH signal for regularly scheduled transmission, wherein the first allocation of resources includes at least one of a time or a frequency resource as described above with reference to FIGS. 2-4. In certain examples, the operations of block 1405 may be performed by the resource allocation module 605 as described above with reference to FIG. 6.

At block 1410, the UE 115 may detect a first reporting trigger for the regularly scheduled transmission as described above with reference to FIGS. 2-4. In certain examples, the operations of block 1410 may be performed by the trigger detection module 610 as described above with reference to FIG. 6.

At block 1415, the UE 115 may transmit, in response to detecting the reporting trigger, the first PRACH signal to the base station over the first allocation of resources as described above with reference to FIGS. 2-4. In certain examples, the operations of block 1415 may be performed by the transmission scheduling module 615 as described above with reference to FIG. 6.

At block 1420, the UE 115 may transmit a request for a PUSCH in the first PRACH signal using at least one of the first allocation of resources or the second allocation of resources as described above with reference to FIGS. 2-4. In certain examples, the operations of block 1420 may be performed by the PUSCH request module 740 as described above with reference to FIG. 7.

Thus, methods 900, 1000, 1100, 1200, 1300, and 1400 may provide for random access procedure in a cellular internet of things system. It should be noted that methods 900, 1000, 1100, 1200, 1300, and 1400 describe possible embodiments, and that the operations and the steps may be rearranged or otherwise modified such that other embodiments are possible. In some examples, aspects from two or more of the methods 900, 1000, 1100, 1200, 1300, and 1400 may be combined.

The detailed description set forth above in connection with the appended drawings describes exemplary embodiments and does not represent all the embodiments that may be implemented or that are within the scope of the claims. The term "exemplary" used throughout this description means "serving as an example, instance, or illustration," and not "preferred" or "advantageous over other embodiments." The detailed description includes specific details for the purpose of providing an understanding of the described techniques. These techniques, however, may be practiced without these specific details. In some instances, well-known structures and devices are shown in block diagram form in order to avoid obscuring the concepts of the described embodiments.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and embodiments are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, electrically erasable programmable read only memory (EEPROM), compact disk (CD) ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc. UTRA and E-UTRA are part of Universal Mobile Telecommunications system (UMTS). 3GPP Long Term Evolution (LTE) and LTE-Advanced (LTE-A) are new releases of Universal Mobile Telecommunications System (UMTS) that use E-UTRA. UTRA, E-UTRA, UMTS, LTE, LTE-A, and Global System for Mobile communications (GSM) are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description above, however, describes an LTE system for purposes of example, and LTE terminology is used in much of the description above, although the techniques are applicable beyond LTE applications.

What is claimed is:

1. A method for wireless communication at a user equipment (UE), comprising:
receiving, from a base station, a first allocation of resources for sending physical random access channel (PRACH) signals for regularly scheduled transmissions and a second allocation of resources for sending PRACH signals for on-demand transmissions, wherein the first allocation of resources and the second allocation of resources each includes at least one of a time or a frequency resource;
detecting a first reporting trigger for a regularly scheduled transmission;
detecting a second reporting trigger for an on-demand transmission which is independent of the regularly scheduled transmission;
transmitting, in response to detecting the second reporting trigger, a first PRACH signal for the on-demand transmission to the base station over the first allocation of resources or the second allocation of resources; and
transmitting, in response to detecting the first reporting trigger, a second PRACH signal for the regularly scheduled transmission to the base station over the first allocation of resources,
wherein on-demand transmissions are assigned a higher priority than regularly scheduled transmissions.

2. The method of claim 1, further comprising:
determining path loss information associated with the base station; and
reporting the path loss information to the base station in the first or second PRACH signal.

3. The method of claim 2, wherein the path loss information is determined by receiving a downlink signal from the base station and measuring strength of the downlink signal.

4. The method of claim 1, wherein the first allocation of resources and the second allocation of resources do not overlap.

5. The method of claim 1, wherein the first allocation of resources is a subset of the second allocation of resources.

6. The method of claim 1, further comprising:
receiving access level information from the base station, the access level information associated with regularly scheduled transmissions and on-demand transmissions;
determining whether access priority for at least one of the first PRACH signal or the second PRACH signal is above the access level information; and
transmitting the first PRACH signal or the second PRACH signal based on the determining.

7. The method of claim 6, wherein the access level information is based on a loading factor of the first allocation of resources and the second allocation of resources.

8. The method of claim 1, further comprising:
receiving, in response to the first PRACH signal, a PRACH response from the base station; and
determining an active identification (ID) for the UE based in part on the PRACH response.

9. The method of claim 8, further comprising:
using the active ID for physical downlink shared channel (PDSCH) and physical uplink shared channel (PUSCH) assignments.

10. The method of claim 1, further comprising:
transmitting a request for a PUSCH in the first PRACH signal using at least one of the first allocation of resources or the second allocation of resources.

11. The method of claim 1, further comprising:
exchanging data with a network based on machine type communication (MTC) procedures.

12. An apparatus for wireless communication at a user equipment (UE), comprising:

means for receiving, from a base station, a first allocation of resources for sending physical random access channel (PRACH) signals for regularly scheduled transmissions and a second allocation of resources for sending PRACH signals for on-demand transmissions, wherein the first allocation of resources and the second allocation of resources each includes at least one of a time or a frequency resource;

means for detecting a first reporting trigger for a regularly scheduled transmission;

means for detecting a second reporting trigger for an on-demand transmission which is independent of the regularly scheduled transmission;

means for transmitting, in response to detecting the second reporting trigger, a first PRACH signal for the on-demand transmission to the base station over the first allocation of resources or the second allocation of resources; and means for transmitting, in response to detecting the first reporting trigger, a second PRACH signal for the regularly scheduled transmission to the base station over the first allocation of resources, wherein on-demand transmissions are assigned a higher priority than regularly scheduled transmissions.

13. The apparatus of claim 12, further comprising:
means for determining path loss information associated with the base station; and
means for reporting the path loss information to the base station in the first or second PRACH signal.

14. The apparatus of claim 13, wherein the path loss information is determined by receiving a downlink signal from the base station and measuring strength of the downlink signal.

15. The apparatus of claim 12, wherein the first allocation of resources and the second allocation of resources do not overlap.

16. The apparatus of claim 12, wherein the first allocation of resources is a subset of the second allocation of resources.

17. The apparatus of claim 12, further comprising:
means for receiving access level information from the base station, the access level information associated with regularly scheduled transmissions and on-demand transmissions;
means for determining whether access priority for at least one of the first PRACH signal or the second PRACH signal is above the access level information; and
means for transmitting the first PRACH signal or the second PRACH signal based on the determining.

18. An apparatus for wireless communication at a user equipment (UE), comprising:
a processor;
memory in electronic communication with the processor; and
instructions stored in the memory; wherein the instructions are executable by the processor to:
receive, from a base station, a first allocation of resources for sending physical random access channel (PRACH) signals for regularly scheduled transmissions and a second allocation of resources for sending PRACH signals for on-demand transmissions, wherein the first allocation of resources and the second allocation of resources each includes at least one of a time or a frequency resource;
detect a first reporting trigger for a regularly scheduled transmission;
detect a second reporting trigger for an on-demand transmission which is independent of the regularly scheduled transmission;
transmit, in response to detecting the second reporting trigger, a first PRACH signal for the on-demand transmission to the base station over the first allocation of resources or the second allocation of resources; and
transmit, in response to detecting the first reporting trigger, a second PRACH signal for the regularly scheduled transmission to the base station over the first allocation of resources,
wherein on-demand transmissions are assigned a higher priority than regularly scheduled transmissions.

19. The apparatus of claim 18, wherein the instructions are executable by the processor to:
determine path loss information associated with the base station; and
report the path loss information to the base station in the first or second PRACH signal.

20. The apparatus of claim 19, wherein the path loss information is determined by receiving a downlink signal from the base station and measuring strength of the downlink signal.

21. The apparatus of claim 18, wherein the first allocation of resources and the second allocation of resources do not overlap.

22. The apparatus of claim 18, wherein the first allocation of resources is a subset of the second allocation of resources.

23. The apparatus of claim 18, wherein the instructions are executable by the processor to:
receive an access level information from the base station, the access level information associated with the regularly scheduled transmission and the on-demand transmission;
determine whether access priority for at least one of the first PRACH signal or the second PRACH signal is above the access level information; and
transmit the first PRACH signal or the second PRACH signal based on the determining.

24. A non-transitory computer-readable medium for storing instructions executable by a processor, comprising:
instructions to receive, from a base station, a first allocation of resources for sending physical random access channel (PRACH) signals for regularly scheduled transmissions and a second allocation of resources for sending PRACH signals for on-demand transmissions, wherein the first allocation of resources and the second allocation of resources each includes at least one of a time or a frequency resource;
instructions to detect a first reporting trigger for a regularly scheduled transmission;
instructions to detect a second reporting trigger for an on-demand transmission which is independent of the regularly scheduled transmission;
instructions to transmit, in response to detecting the second reporting trigger, a first PRACH signal for the on-demand transmission to the base station over the first allocation of resources or the second allocation of resources; and
instructions to transmit, in response to detecting the first reporting trigger, a second PRACH signal for the regularly scheduled transmission to the base station over the first allocation of resources,
wherein on-demand transmissions are assigned a higher priority than regularly scheduled transmissions.

25. The non-transitory computer-readable medium of claim 24, wherein the first allocation of resources and the second allocation of resources do not overlap.

26. The non-transitory computer-readable medium of claim 24, wherein the first allocation of resources is a subset of the second allocation of resources.

27. The non-transitory computer-readable medium of claim 24, further comprising:
- instructions to receive access level information from the base station, the access level information associated with regularly scheduled transmissions and on-demand transmissions;
- instructions to determine whether access priority for at least one of the first PRACH signal or the second PRACH signal is above the access level information; and
- instructions to transmit the first PRACH signal or the second PRACH signal based on the determining.

* * * * *